US010339019B2

(12) United States Patent
Ogihara

(10) Patent No.: US 10,339,019 B2
(45) Date of Patent: Jul. 2, 2019

(54) PACKET CAPTURING SYSTEM, PACKET CAPTURING APPARATUS AND METHOD

(71) Applicant: FUJITSU LIMITED, Kawasaki-shi, Kanagawa (JP)

(72) Inventor: Kazutaka Ogihara, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 69 days.

(21) Appl. No.: 15/787,337

(22) Filed: Oct. 18, 2017

(65) Prior Publication Data

US 2018/0121303 A1 May 3, 2018

(30) Foreign Application Priority Data

Nov. 2, 2016 (JP) .................................. 2016-215343

(51) Int. Cl.
| | | |
|---|---|---|
| *G06F 11/00* | (2006.01) | |
| *G06F 11/20* | (2006.01) | |
| *G06F 3/06* | (2006.01) | |
| *H04L 12/721* | (2013.01) | |
| *H04L 12/931* | (2013.01) | |

(52) U.S. Cl.
CPC .......... *G06F 11/2069* (2013.01); *G06F 3/065* (2013.01); *G06F 3/067* (2013.01); *G06F 3/0619* (2013.01); *G06F 11/2082* (2013.01); *H04L 45/72* (2013.01); *G06F 2201/805* (2013.01); *G06F 2201/82* (2013.01); *H04L 49/208* (2013.01)

(58) Field of Classification Search
CPC .... G06F 11/2069; G06F 3/0619; G06F 3/065; G06F 3/067; G06F 11/2082; G06F 2201/805; G06F 2201/82; H04L 45/72; H04L 49/208
See application file for complete search history.

(56) References Cited

U.S. PATENT DOCUMENTS

| | | | | |
|---|---|---|---|---|
| 7,684,347 | B2* | 3/2010 | Merkey ................... | H04L 43/02 370/252 |
| 7,808,889 | B1* | 10/2010 | Howard .............. | G06F 11/1658 370/217 |
| 2002/0107980 | A1* | 8/2002 | Kawaguchi ........... | G06F 13/385 709/238 |
| 2009/0271656 | A1* | 10/2009 | Yokota ................ | H04L 41/0677 714/6.23 |

FOREIGN PATENT DOCUMENTS

| | | |
|---|---|---|
| JP | 9-128260 | 5/1997 |
| JP | 2012-94998 | 5/2012 |

\* cited by examiner

*Primary Examiner* — Jason B Bryan

(74) *Attorney, Agent, or Firm* — Staas & Halsey LLP

(57) ABSTRACT

A packet capturing system includes a first apparatus configured to store, into a first storage device, a first mirror packet, and a second apparatus configured to store the first mirror packet into a second storage device, wherein the first apparatus is configured to determine whether the second apparatus is in an operation state or a non-operation state, delete, when the first apparatus determines the second apparatus is in the operation state, the first mirror packet stored in the first storage device, and store into the second storage device, when the first apparatus determines the second apparatus is in the non-operation state, a second mirror packet generated by mirroring a second packet transmitted in a network, while maintaining the first mirror packet stored in the first storage device.

18 Claims, 28 Drawing Sheets

FIG. 22

| ITEM NO. | PACKET IDENTIFIER | ACQUISITION TIME |
|---|---|---|
| 1 | PT2-001 | 2016/08/24 11:54:05 |
| 2 | PT2-002 | 2016/08/24 12:00:40 |
| 3 | PT2-003 | 2016/08/24 12:00:15 |
| 4 | PT2-003 | 2016/08/24 12:01:17 |
| 5 | PT2-004 | 2016/08/24 12:02:53 |
| ... | ... | ... |

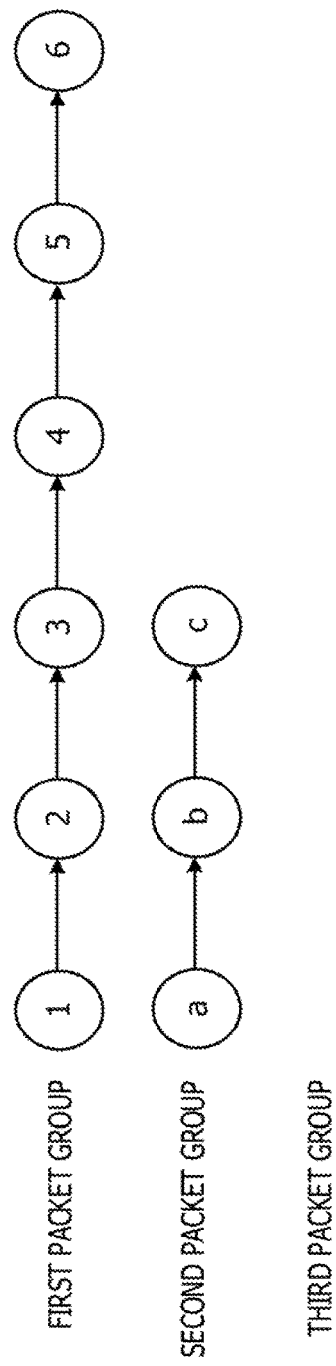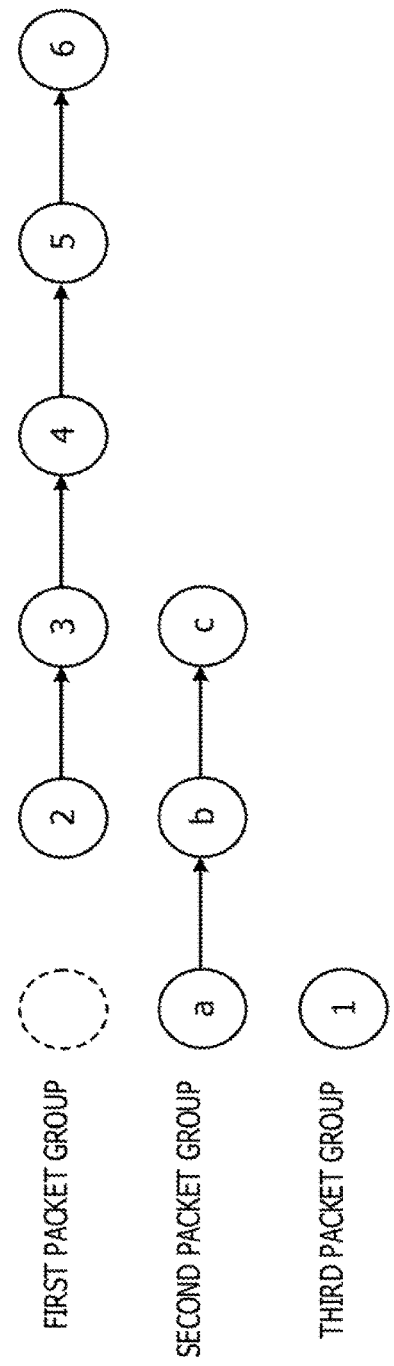

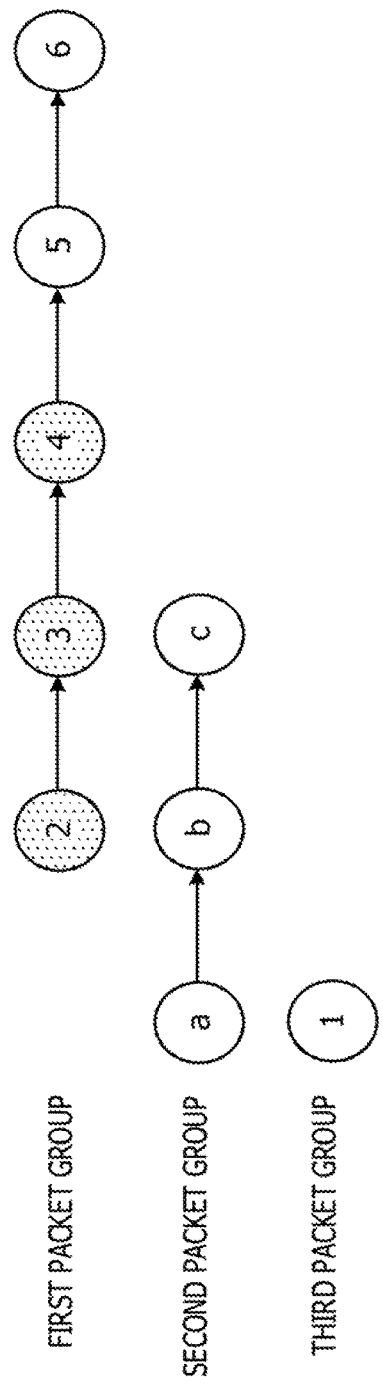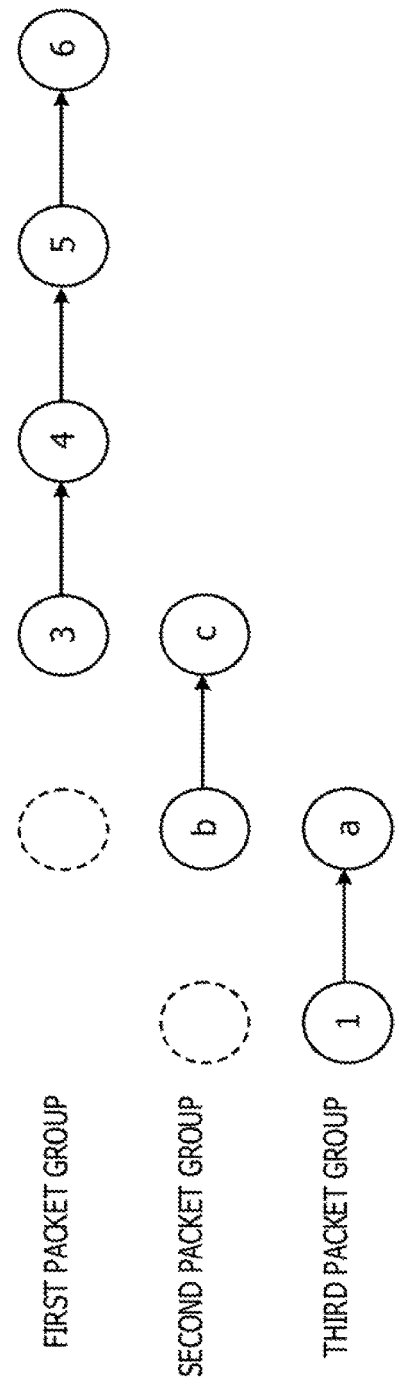

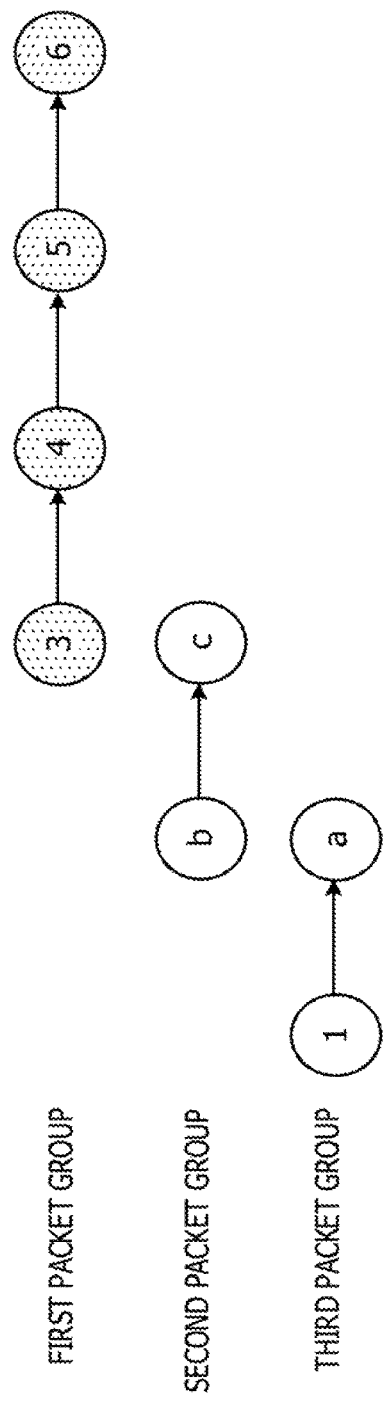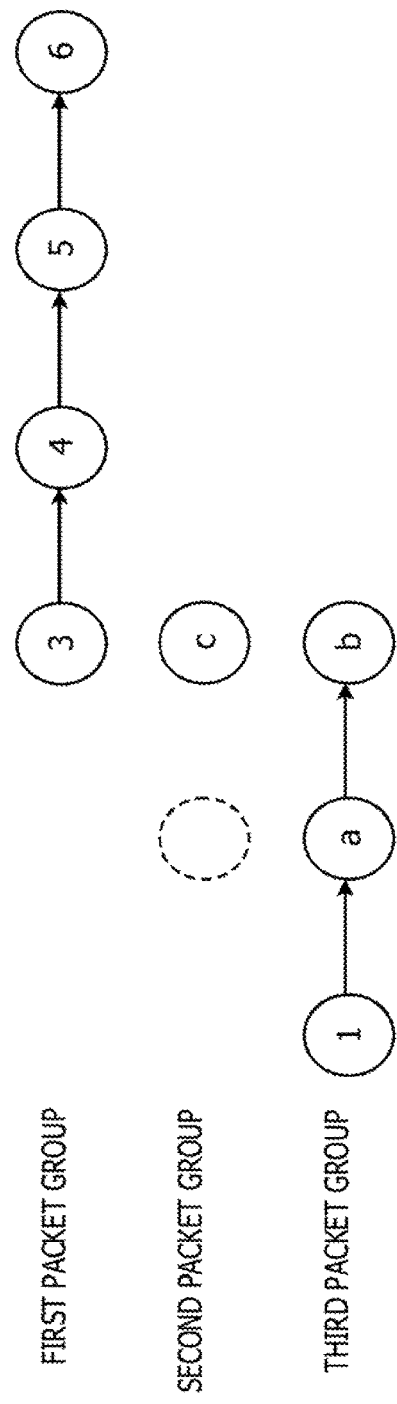
FIG. 25A
FIG. 25B

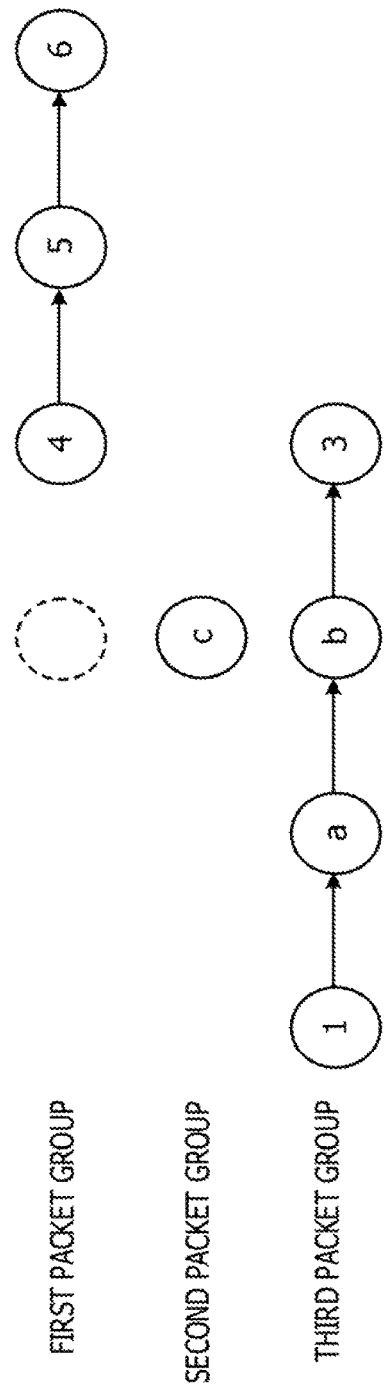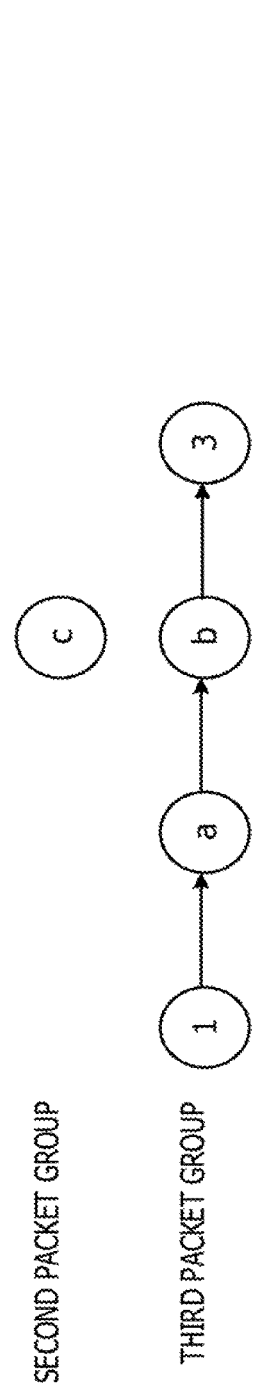

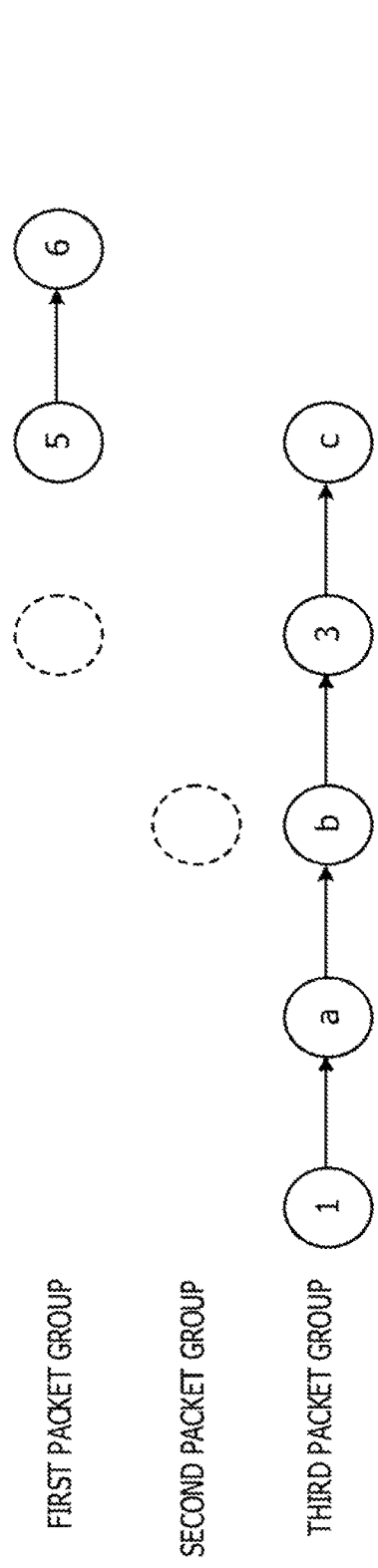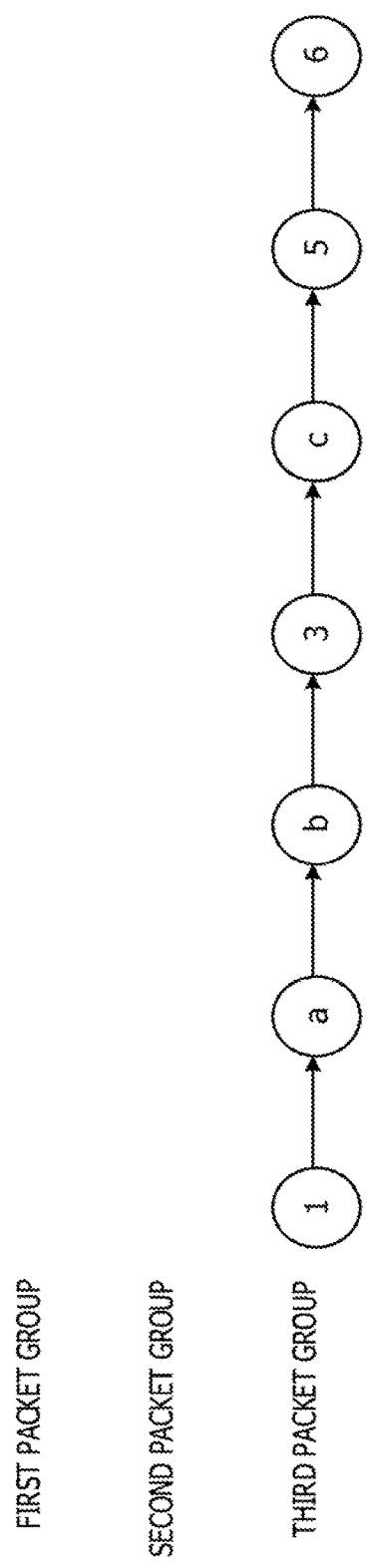

PACKET CAPTURING SYSTEM, PACKET CAPTURING APPARATUS AND METHOD

CROSS-REFERENCE TO RELATED APPLICATION

This application is based upon and claims the benefit of priority of the prior Japanese Patent Application No. 2016-215343, filed on Nov. 2, 2016, the entire contents of which are incorporated herein by reference.

FIELD

The embodiments discussed herein are related to a packet capturing system, a packet capturing apparatus and a method.

BACKGROUND

For example, a provider providing a service to users (hereinafter also referred to simply as a provider) sometimes acquires and analyzes a communication packet flowing in a network (hereinafter also referred to simply as a packet), and monitors operation state of a system in operation and a network.

Specifically, the provider installs a network distribution device (for example, a network tap) on a network. Then, the network distribution device acquires packets flowing in the network and performs mirroring of the acquired packets. Thereafter, the network distribution device transmits packets generated by mirroring to a packet capture apparatus (hereinafter also referred to simply as a capture apparatus) which then performs packet analysis. The capture apparatus is thus allowed to accumulate mirror packets of the analysis target into a storage device. Hereinafter, a packet to be mirrored in the network distribution device (packet which the network distribution device acquires from the network) is also referred to as a system packet, and a packet generated by mirroring of the system packet (packet which the capture apparatus analyzes) is also referred to as a mirror packet. Related techniques are disclosed in Japanese Laid-open Patent Publication Nos. 9-128260 and 2012-094998.

SUMMARY

According to an aspect of the invention, a packet capturing system includes a first apparatus configured to be coupled to a network, the first apparatus including a first memory and a first processor coupled to the first memory, the first processor being configured to store, into a first storage device, a first mirror packet which is generated by mirroring a first packet transmitted in the network, and a second apparatus configured to be coupled to the network, the second apparatus including a second memory and a second processor coupled to the second memory, the second processor being configured to store the first mirror packet into a second storage device, wherein the first processor is configured to determine whether the second apparatus is in an operation state or a non-operation state, delete, when the first processor determines the second apparatus is in the operation state, the first mirror packet stored in the first storage device, and store into the second storage device, when the first processor determines the second apparatus is in the non-operation state, a second mirror packet generated by mirroring a second packet transmitted in the network, while maintaining the first mirror packet stored in the first storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 illustrates a specific example of deduplication information;

FIGS. 23A and 23B illustrate specific examples of processing of S61 to S64;

FIGS. 24A and 24B illustrate specific examples of processing of S61 to S64;

FIGS. 25A and 25B illustrate specific examples of processing of S61 to S64;

FIGS. 26A and 26B illustrate specific examples of processing of S61 to S64;

FIGS. 27A and 27B illustrate specific examples of processing of S61 to S64; and

DESCRIPTION OF EMBODIMENTS

When accumulating mirror packets, the provider, for example, redundantly configures a network distribution device and a capture apparatus. Thus, even when a failure occurs in a portion of the capture apparatus, the provider may continue accumulation of packets.

However, in this case, each capture apparatus accumulates mirror packets transmitted from the network distribution device. Therefore, amount of mirror packets accumulated into a storage device by capture apparatuses increases in proportion to the number of capture apparatuses accumulating mirror packets.

Meantime, the provider sometimes causes a capture apparatus (hereinafter referred to as an active system capture apparatus) among a plurality of capture apparatuses to accumulate mirror packets. Then, when the active system capture apparatus is failed, the provider causes another capture apparatus (hereinafter referred to as a standby system capture apparatus) other than the active capture apparatus to start accumulation of packets. Thus, the capture apparatus may reduce amount of mirror packets accumulated in the storage device.

However, the standby system capture apparatus may take a time before starting accumulation of mirror packets. Thus, when a failure or the like arises in the active system capture apparatus, the standby system capture apparatus may not accumulate a portion of mirror packets transmitted by the network distribution device.

[Configuration of Information Processing System]

Figure 1:
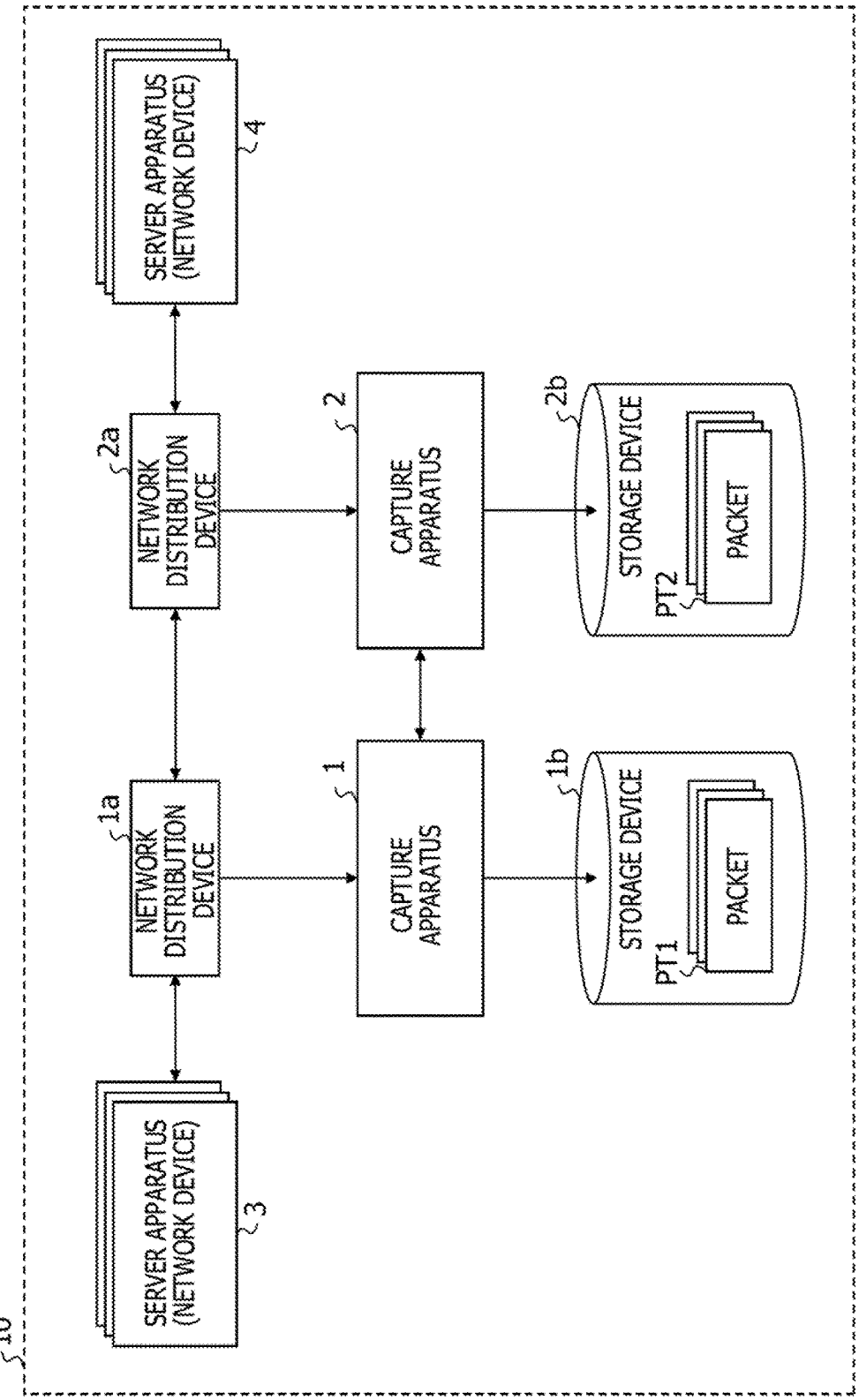
FIG. 1 illustrates an overall configuration of an information processing system.

FIG. 1 illustrates an overall configuration of an information processing system 10. The information processing system 10 (hereinafter referred to as a packet capture system 10) illustrated in FIG. 1 includes a capture apparatus 1 (hereinafter also referred to as a computer 1), a capture apparatus 2 (hereinafter also referred to as a computer 2), a server apparatus 3, and a server apparatus 4. Also, the information processing system 10 illustrated in FIG. 1 includes a network distribution device 1a and a network distribution device 2a disposed on a network between the server apparatus 3 and server apparatus 4. Further, the information processing system 10 illustrated in FIG. 1 includes a storage device 1b into which the capture apparatus 1 stores mirror packets, and a storage device 2b into which the capture apparatus 2 stores mirror packets.

The server apparatus 3 and server apparatus 4 are physical machine groups comprising at least one physical machine respectively, and perform a processing for the provider to provide services to the user. Then, the server apparatus 3 and server apparatus 4 transmit and receive a system packet as appropriate. Hereinafter, transmission and reception of the system packet by the server apparatus 3 and server apparatus 4 is described. However, the system packet may be transmitted and received via a network device such as a router.

The network distribution device 1a is, for example, a network tap, that is configured to acquire a system packet when the system packet transmitted by the server apparatus 3 or server apparatus 4 is routed via the network distribution device 1a. Then, the network distribution device 1a generates the mirror packet by mirroring the acquired system packet, and transmits the generated mirror packet to the capture apparatus 1.

The network distribution device 2a is, for example, a network tap, that is configured to acquire a system packet when the system packet transmitted by the server apparatus 3 or server apparatus 4 is routed via the network distribution device 2a. Then, the network distribution device 2a generates the mirror packet by mirroring the acquired system packet, and transmits the generated mirror packet to the capture apparatus 2.

Upon receiving the mirror packet from the network distribution device 1a, the capture apparatus 1 accumulates the received mirror packet in the storage device 1b. Then, for example, when the provider transmits an instruction to analyze the mirror packet via an operation terminal (not illustrated), the capture apparatus 1 performs analysis of mirror packets stored in the storage device 1b.

Upon receiving the mirror packet from the network distribution device 2a, the capture apparatus 2 accumulates the received mirror packet in the storage device 2b. Then, for example, when the provider transmits an instruction to analyze the mirror packet via an operation terminal (not illustrated), the capture apparatus 2 performs analysis of mirror packets stored in the storage device 2b.

Further, the capture apparatus 1 and capture apparatus 2, for example, notify (hereinafter referred to as an alive notification) the other capture apparatus, at predetermined time intervals, of notification indicating that the capture apparatus functions normally.

Each of the storage device 1b and the storage device 2b may be a storage device comprising a hard disk drive (HDD) and a solid state drive (SSD). Hereinafter, a mirror packet accumulated in the storage device 1b is also referred to as a mirror packet PT1 or a packet PT1, and a mirror packet accumulated in the storage device 2b is referred to as a mirror packet PT2 or a packet PT2.

The provider, for example, redundantly configures the network distribution device and capture apparatus as illustrated in FIG. 1. Thus, for example, even when a failure occurs in the capture apparatus 1 or network distribution device 1a, the provider may continue accumulation of packets with the capture apparatus 2 or network distribution device 2a.

However, in this case, the capture apparatus 1 and capture apparatus 2 accumulate mirror packets transmitted respectively from the network distribution device 1a and network distribution device 2a. Therefore, amount of mirror packets accumulated into the storage device 1b and storage device 2b increases in proportion to the number of capture apparatuses accumulating mirror packets.

Meantime, the provider, for example, causes only the capture apparatus 1 being an active system capture apparatus among the capture apparatus 1 and capture apparatus 2 to accumulate mirror packets. Then, when the capture apparatus 1 is failed, the provider causes the capture apparatus 2 being a standby system capture apparatus to start accumulation of packets. Thus, the capture apparatus 1 and capture apparatus 2 may reduce amount of mirror packets to be accumulated.

However, the capture apparatus 2 being a standby system capture apparatus may take a time before starting accumulation of mirror packets. Thus, when a failure or the like occurs in the capture apparatus 1, the capture apparatus 2 may not accumulate a part of mirror packets transmitted from the network distribution device 2a before starting accumulation of mirror packets.

Thus, the capture apparatus 2 (hereinafter also referred to as a first apparatus) being a standby system capture apparatus stores the mirror packet into the storage device 2b (hereinafter also referred to as a first storage unit) upon acquiring a mirror packet flowing in the network. Then, the capture apparatus 2 determines operation state of the capture apparatus 1 (hereinafter also referred to as a second apparatus) being an active system capture apparatus, and when it is determined that operation state of the capture apparatus 1 is in the first state, the capture apparatus 2 deletes mirror packets stored in the storage device 2b.

More specifically, for example, when it is determined that operation state of the capture apparatus 1 is normal, the capture apparatus 2 deletes, from the storage device 2b, mirror packets that may be determined as mirror packets of the same content accumulated by the capture apparatus 1 being an active system capture apparatus among mirror packets accumulated by the storage device 2b. In the meantime, the capture apparatus 2 does not delete mirror packets that are not determined as mirror packets of the same content accumulated by the capture apparatus 1 among mirror packets accumulated by the storage device 2b.

On the other hand, when it is determined that operation state of the capture apparatus 1 is in the second state, the capture apparatus 2 changes a storage device to store the mirror packet to the storage device 1b (hereinafter also referred to as a second storage unit) being a storage device into which the capture apparatus 1 accumulates mirror packets.

More specifically, for example, when it is determined that operation state of the capture apparatus 1 is abnormal, the capture apparatus 2 operates as an active system capture apparatus in place of the capture apparatus 1 and starts accumulation of mirror packets into the storage device 1b being a storage device from which the mirror is not deleted.

Thus, the capture apparatus 2 may reduce amount of mirror packets accumulated in the storage device 2b and avoid occurrence of mirror packets not accumulated by any of the capture apparatus 1 and capture apparatus 2. Consequently, the capture apparatus 2 may accumulate mirror packets efficiently.

[Hardware Configuration of Information Processing System]

Figure 2:
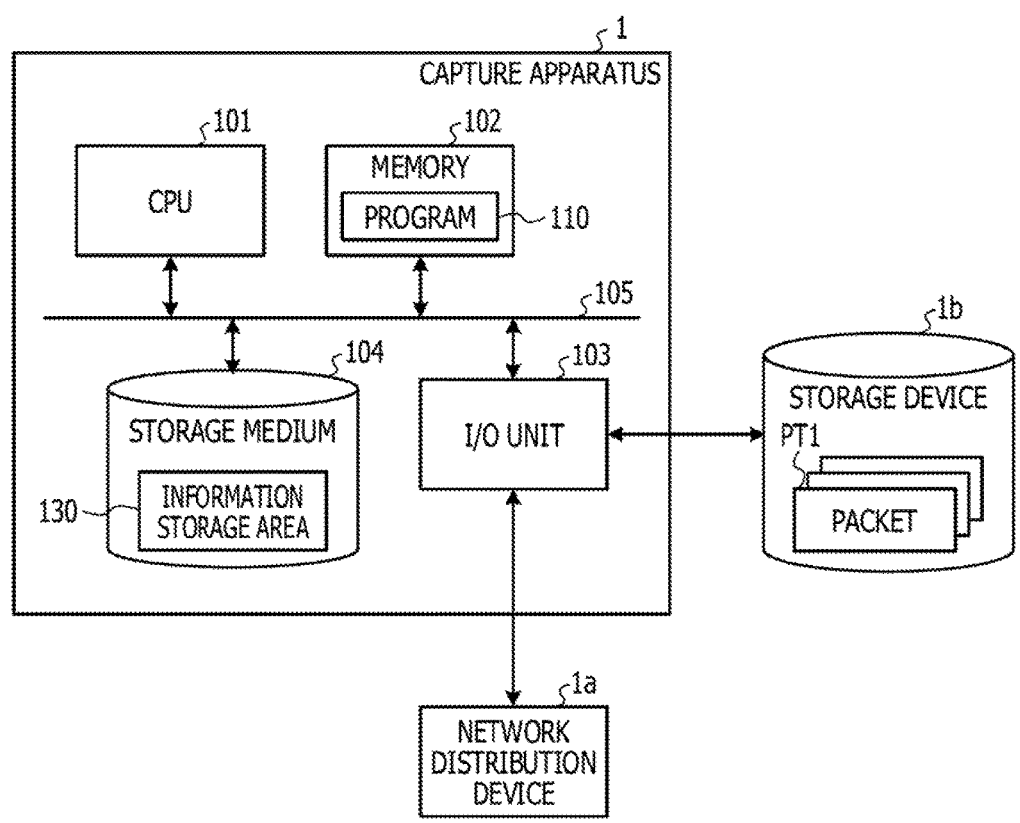
FIG. 2 illustrates a hardware configuration of a capture apparatus 1.
Figure 3:
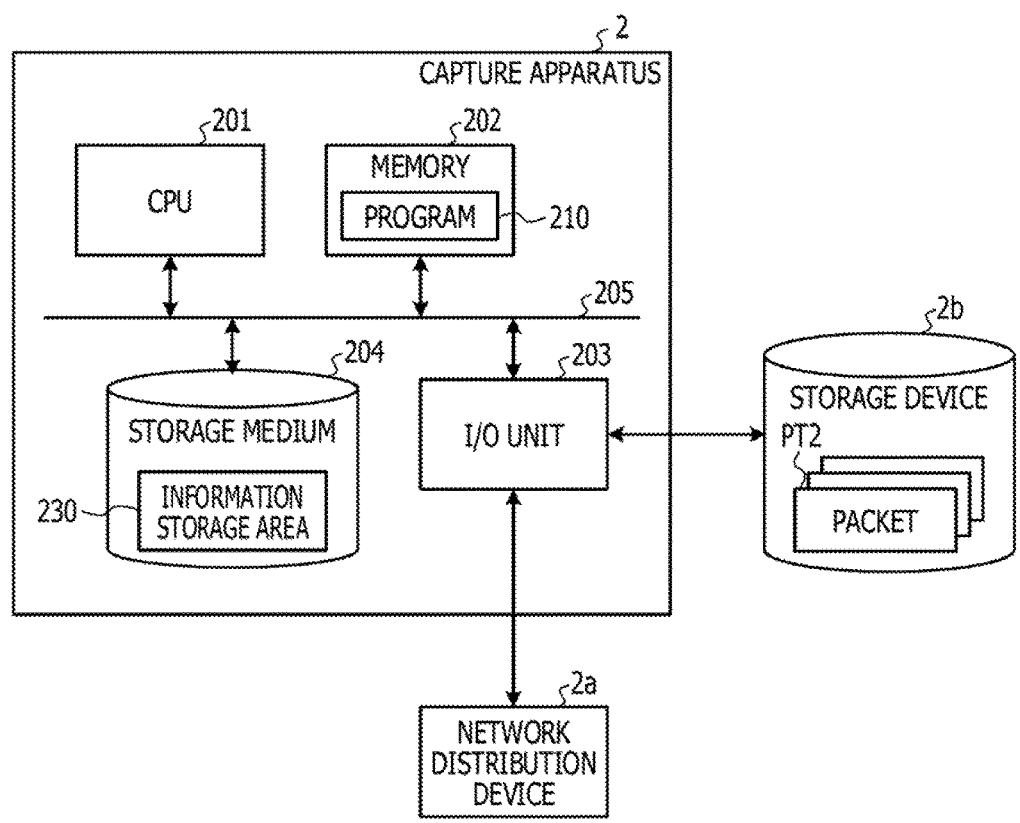
FIG. 3 illustrates a hardware configuration of a capture apparatus 2.

Next, hardware configuration of the information processing system 10 is described. FIG. 2 illustrates a hardware configuration of the capture apparatus 1. FIG. 3 illustrates a hardware configuration of the capture apparatus 2.

As illustrated in FIG. 2, the capture apparatus 1 includes a CPU 101 being a processor, a memory 102, an external interface (I/O unit) 103, and a storage medium 104. These components are coupled to one another via a bus 105.

The storage medium 104 is configured to, for example, store a program 110 for performing a processing (hereinafter also referred to as a packet capture processing) of accumulating mirror packets into a program storage area (not illustrated) in the storage medium 104. The storage medium 104 includes, for example, an information storage area 130 (hereinafter also referred to as a storage unit 130) configured to store information used when performing the packet capture processing.

The CPU 101 is configured to load the program 110 from the storage medium 104 into the memory 102 during execution of the program 110 and perform the packet capture processing in cooperation with the program 110. The external interface 103 communicates with the network distribution device 1a and storage device 1b.

As illustrated in FIG. 3, capture apparatus 2 includes a CPU 201 being a processor, a memory 202, an external interface (I/O unit) 203, and a storage medium 204. These components are coupled to one another via a bus 205.

The storage medium 204 is configured to store, for example, a program 210 for performing the packet capture processing into a program storage area (not illustrated) in the storage medium 204. The storage medium 204 includes, for example, an information storage area 230 (hereinafter also referred to as a storage unit 230) configured to store information used when performing the packet capture processing.

The CPU 201 is configured to load the program 210 from the storage medium 204 into the memory 202 during execution of the program 210 and perform the packet capture processing in cooperation with the program 210. The external interface 203 communicates with the network distribution device 2a and storage device 2b.

[Functions of Information Processing System]

Figure 4:
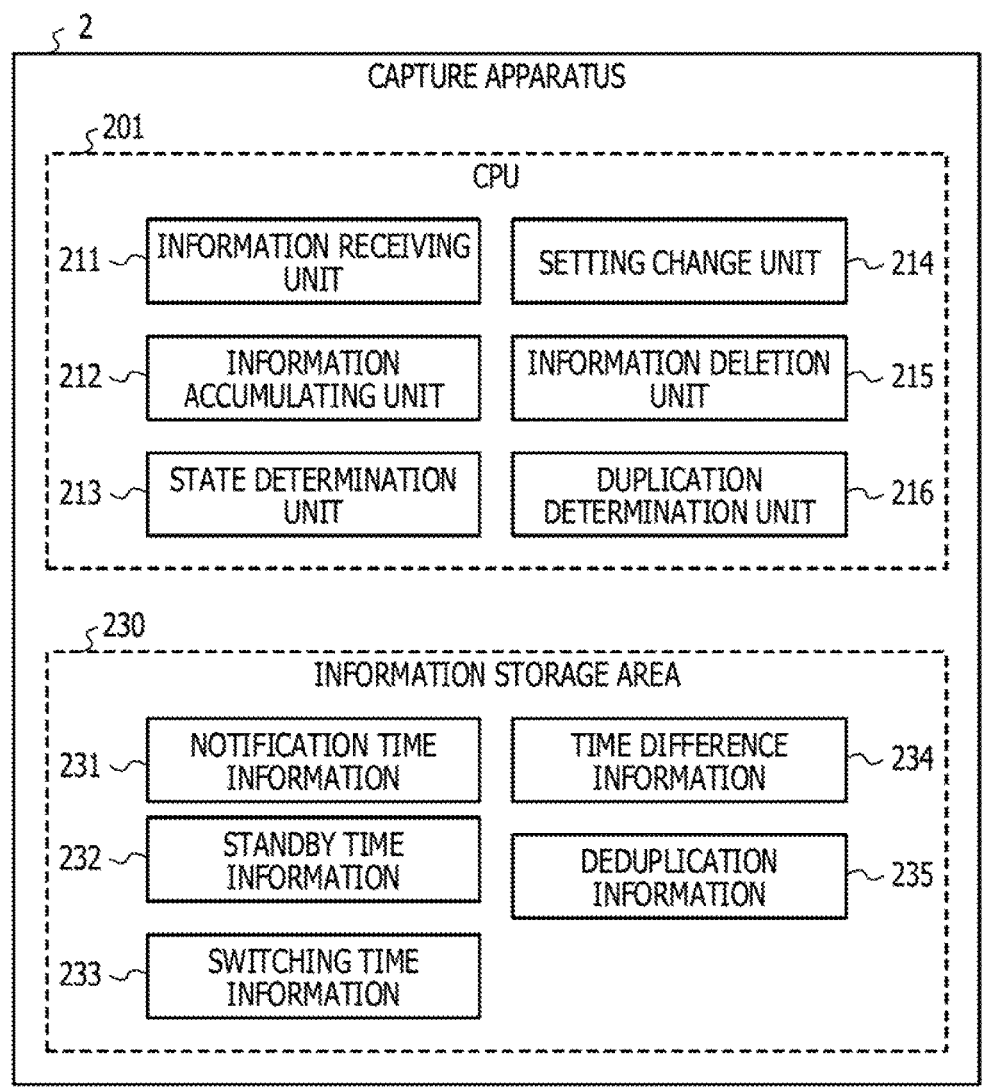
FIG. 4 is a functional block diagram of the capture apparatus 1.
Figure 5:
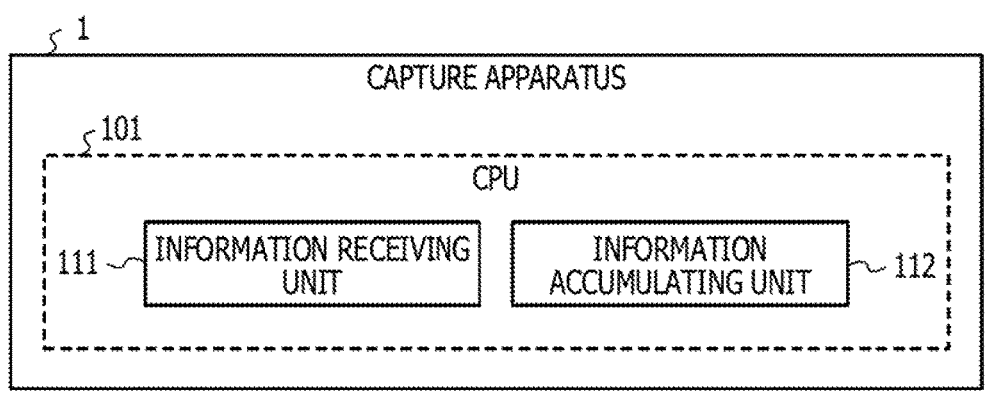
FIG. 5 is a functional block diagram of the capture apparatus 2.

Next, functions of the information processing system 10 are described. FIG. 4 is a functional block diagram of the capture apparatus 2. FIG. 5 is a functional block diagram of the capture apparatus 1.

First, the functional block diagram of the capture apparatus 2 being a standby system capture apparatus is described. As illustrated in FIG. 4, the CPU 201 of the capture apparatus 2 operates in cooperation with the program 210, for example, as an information receiving unit 211, an information accumulating unit 212, a state determination unit 213, a setting change unit 214, an information deletion unit 215, and a duplication determination unit 216. The information storage area 230 stores notification time information 231, standby time information 232, switching time information 233, time difference information 234, and deduplication information 235. Hereinafter, the setting change unit 214 and information deletion unit 215 are also collectively referred to as a packet management unit.

The information receiving unit 211 is configured to acquire (receive) a mirror packet transmitted by the network distribution device 2a. The information accumulating unit 212 is configured to store the mirror packet acquired by the information receiving unit 211 into the storage device 2b.

The state determination unit 213 is configured to determine, for example, operation state of the capture apparatus 1 being an active system capture apparatus. Specifically, the state determination unit 213 determines that operation state of the capture apparatus 1 is in the first state (normal state) in a time period elapsed by a first time from reception of the alive notification transmitted by the capture apparatus 2. The first time is, for example, the sum of a time indicated by the notification time information 231 and a time indicated by the standby time information 232. The notification time information 231 is information indicating time intervals at which the capture apparatus 1 transmits the alive notification to the capture apparatus 2. The standby time information 232 is information indicating a standby time before determining that the capture apparatus 1 is turned into an abnormal state after elapse of time intervals indicated by the notification time information 231 without receiving the alive notification from the capture apparatus 1.

On the other hand, upon elapse of the first time since reception of the alive notification transmitted from the capture apparatus 1 (upon elapse of the first time without receiving the alive notification transmitted by the capture apparatus 1), the state determination unit 213 determines that operation state of the capture apparatus 1 is in a second state (abnormal state).

When determined that operation state of the capture apparatus 1 is in the second state, the setting change unit 214 changes a storage device to store the mirror packet from the storage device 2b to the storage device 1b.

When determined that operation state of the capture apparatus 2 is in the first state, the information deletion unit 215 deletes mirror packets stored in the storage device 2b.

Specifically, in this case, the information deletion unit 215 deletes mirror packets whose added acquisition time (time when the information accumulating unit 212 accumulates in the storage device 2b) is older than a time going back by a second time and a third time from the present time. The second time is, for example, the sum of the first time and a time indicated by the switching time information 233. The switching time information 233 is information indicating a time for the setting change unit 214 to change the storage device to store the mirror packet from the storage device 2b to the storage device 1b. The third time is a time indicated by time difference information 234. The time difference information 234 is information indicating a time difference between a system time of the capture apparatus 1 and a system time of the capture apparatus 2.

The duplication determination unit 216 determines whether a mirror packet of the same content (hereinafter also referred to as a duplication packet) is included in mirror packets stored in the storage device 1b and mirror packets stored in the storage device 2b. Then, when it is determined that a duplication packet exists, the information deletion unit 215 deletes the duplication packet stored in the storage device 1b or storage device 2b. The deduplication information 235 is described later.

Next, the functional block diagram of the capture apparatus 1 is described. As illustrated in FIG. 5, the CPU 101 of the capture apparatus 1 includes, for example, an information receiving unit 111 and an information accumulating unit 112 by operating in cooperation with the program 110.

The information receiving unit 111 is configured to acquire (receive) a mirror packet transmitted by the network distribution device 1a. The information accumulating unit 112 is configured to store the mirror packet acquired by the information receiving unit 111 into the storage device 1b.

The capture apparatus 1 may include the same functions as the state determination unit 213, setting change unit 214, information deletion unit 215, and duplication determination unit 216.

First Embodiment

Figure 6:
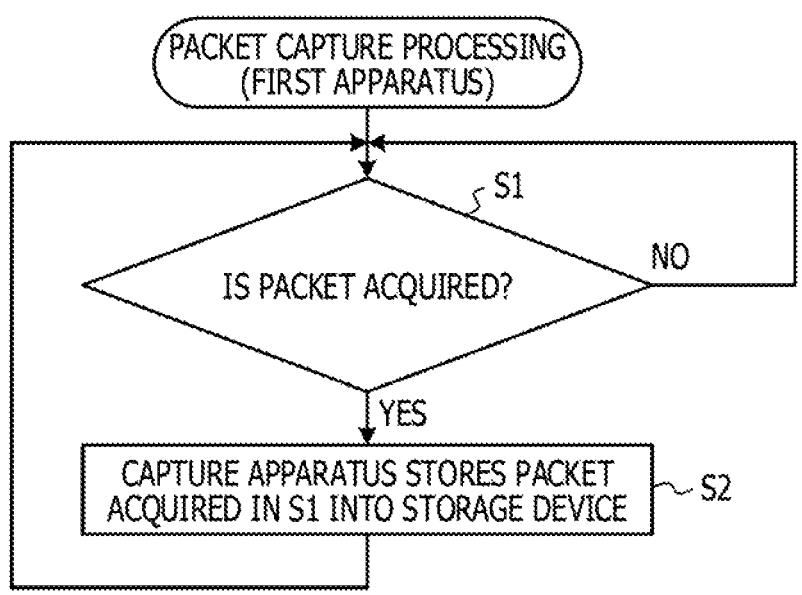
FIG. 6 is a flowchart illustrating an overview of a packet capture processing in a first embodiment.
Figure 7:
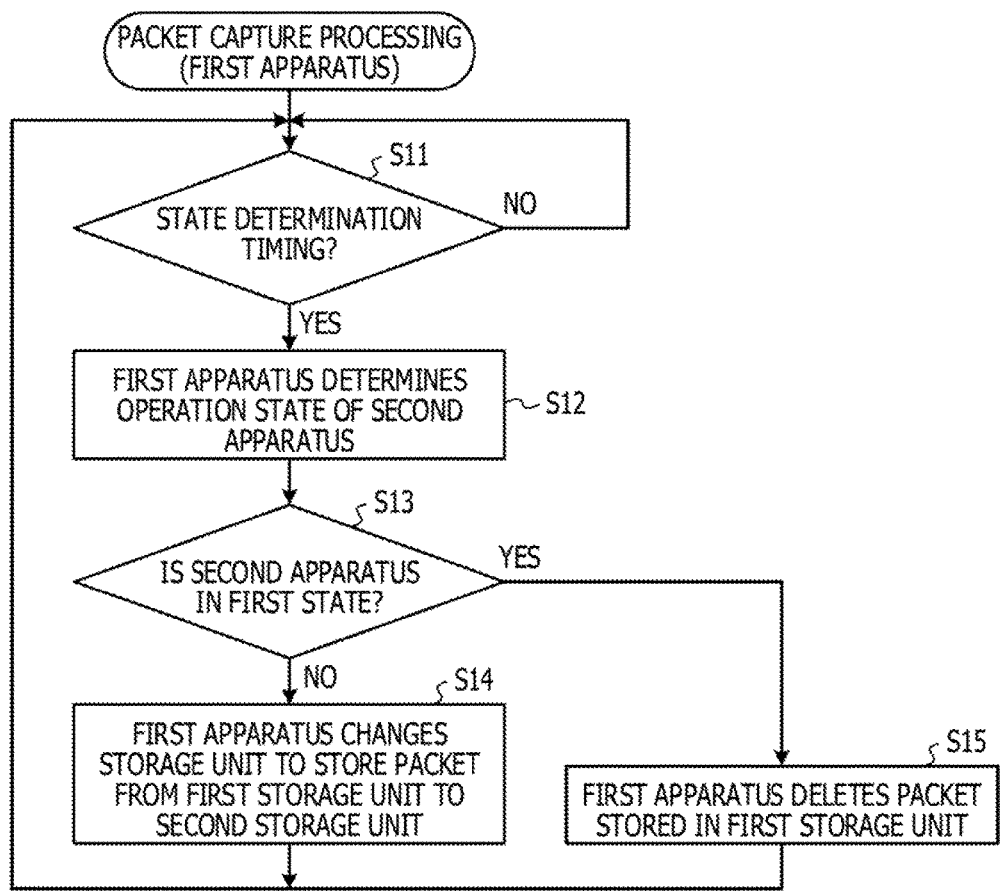
FIG. 7 is a flowchart illustrating the overview of the packet capture processing in the first embodiment.
Figure 8:
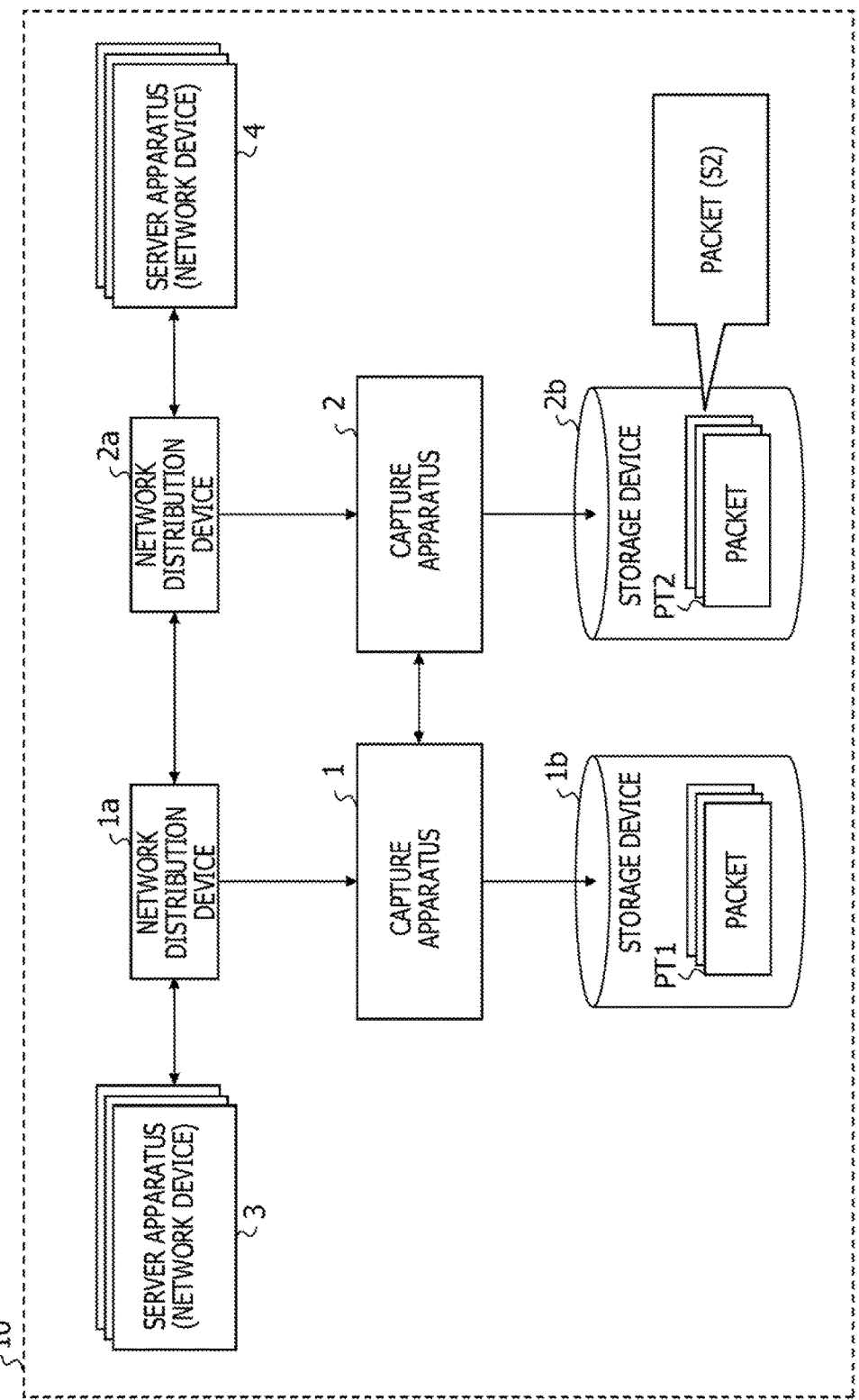
FIG. 8 is a flowchart illustrating the overview of the packet capture processing in the first embodiment.
Figure 9:
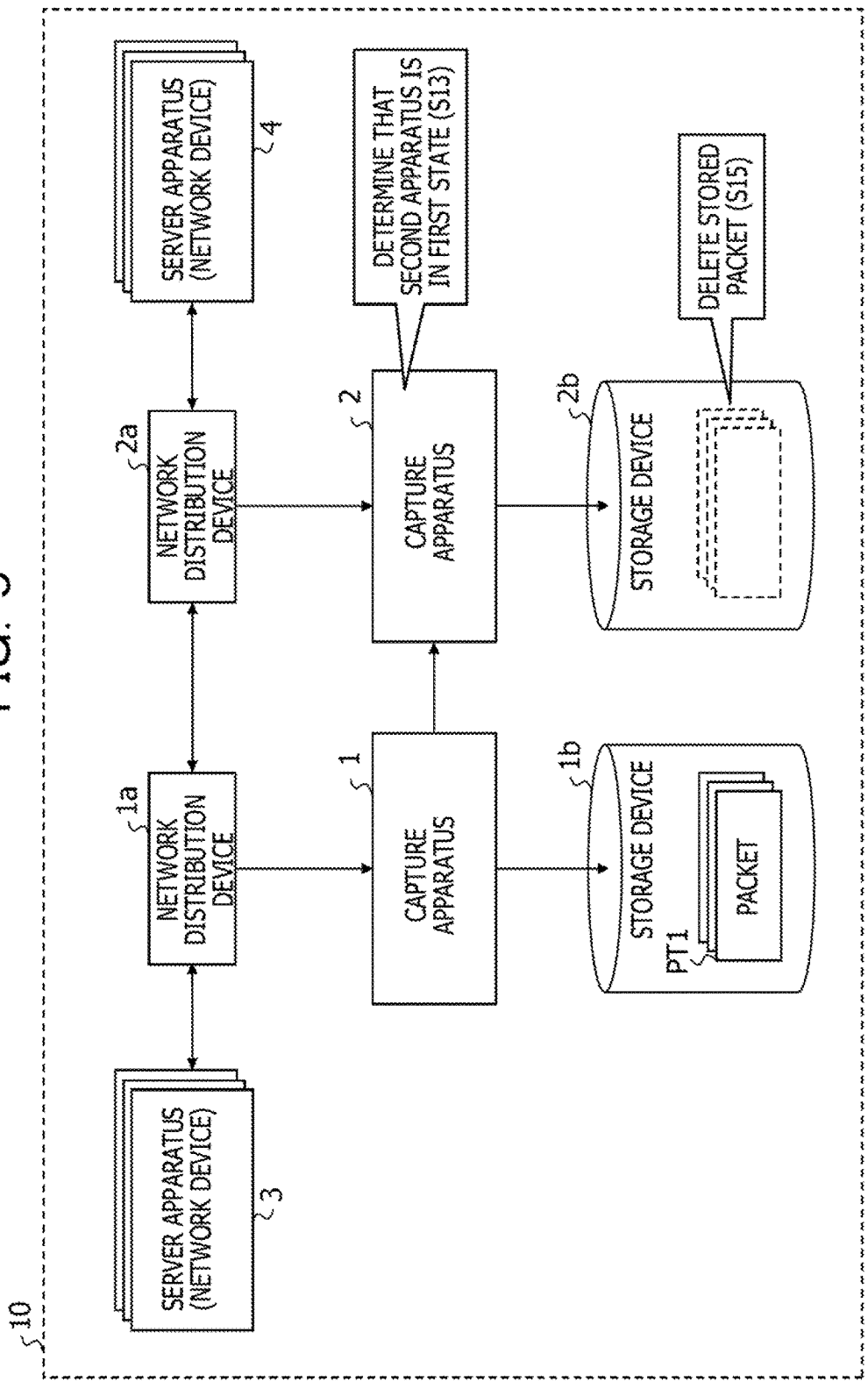
FIG. 9 illustrates the overview of the packet capture processing in the first embodiment.
Figure 10:
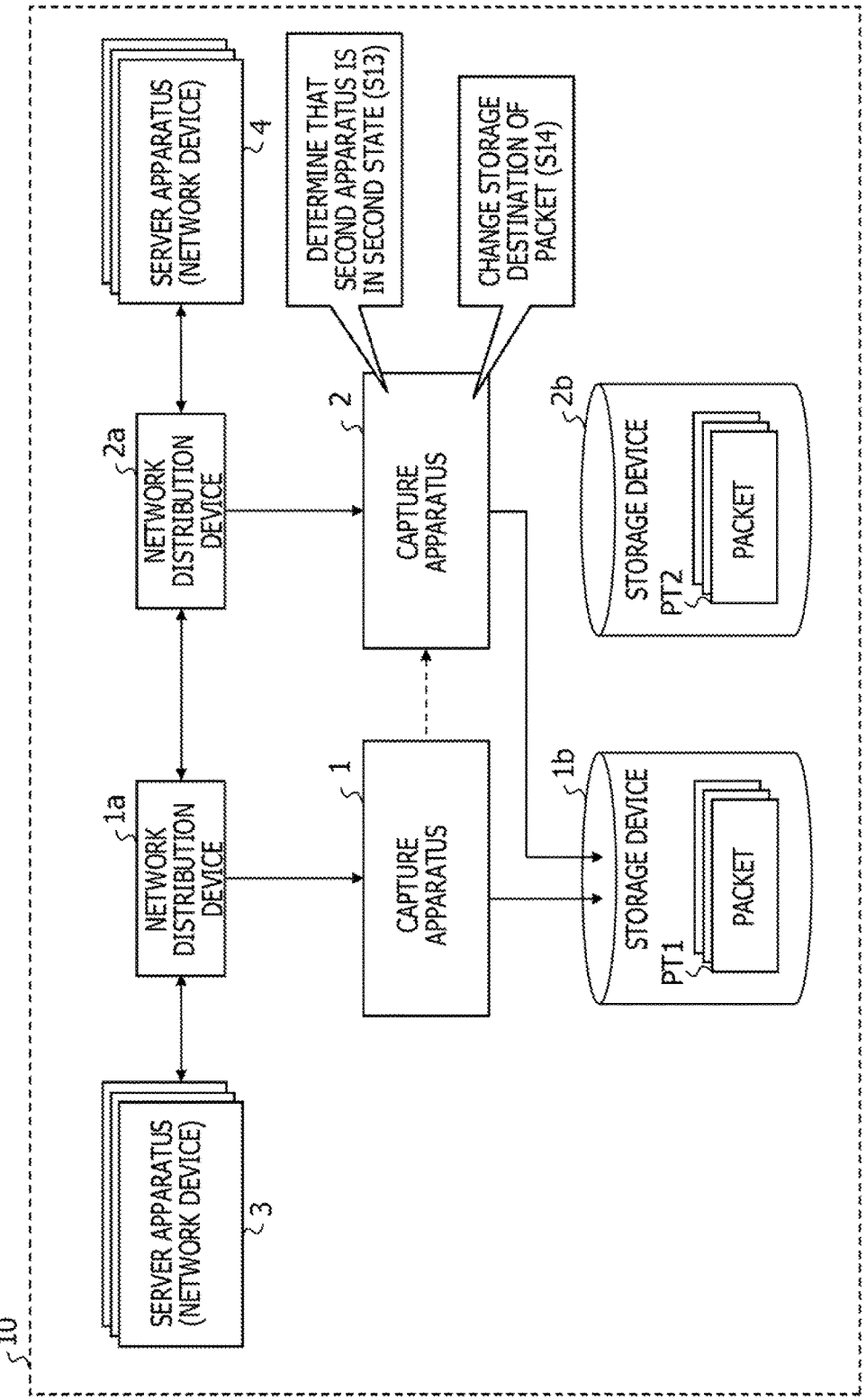
FIG. 10 illustrates the overview of the packet capture processing in the first embodiment.

Next, the first embodiment is described. FIGS. 6 and 7 are flowcharts illustrating an overview of a packet capture processing in the first embodiment. FIGS. 8 to 10 illustrate an overview of the packet capture processing in the first embodiment. An overview of the packet capture processing in the first embodiment illustrated in FIGS. 6 and 7 is described with reference to FIGS. 8 to 10.

As indicated in FIG. 6, the capture apparatus 2 standbys until receiving a mirror packet transmitted by the network distribution device 2a (S1: NO). Specifically, the capture apparatus 2 standbys until receiving a mirror packet transmitted by the network distribution device 2a.

Then, upon receiving the mirror packet (S1: YES), the capture apparatus 2 stores the mirror packet acquired in the processing of the step S1 into the storage device 2b as illustrated in FIG. 8 (S2).

On the other hand, as illustrated in FIG. 7, the capture apparatus 2 standbys, for example, until a timing (hereinafter also referred to as a state determination timing) of determining operation state of the capture apparatus 1 comes (S11: NO). The state determination timing may be, for example, a regular timing. Then, when the state determination timing comes (S11: YES), the capture apparatus 2 determines operation state of the capture apparatus 1 (S12).

When determined that operation state of the capture apparatus 1 is in the first state (normal state) (S13: YES), the capture apparatus 2 deletes mirror packets stored in the storage device 2b as illustrated in FIG. 9 (S15).

Specifically, when it is determined that no failure or the like occurs in the capture apparatus 1, the capture apparatus 2 deletes mirror packets that may be determined as mirror packets of the same content accumulated into the storage device 1b by the capture apparatus 1. In this case, the capture apparatus 2 does not delete mirror packets that may not be determined as mirror packets of the same content accumulated into the storage device 1b by the capture apparatus 1.

On the other hand, when it is determined that operation state of the capture apparatus 1 is in the second state (abnormal state), the capture apparatus 2 changes a storage device to store the mirror packet from the storage device 2b to the storage device 1b as illustrated in FIG. 10 (S14).

More specifically, when it is determined that a failure or the like occurs in the capture apparatus 1, the capture apparatus 2 starts to operate as an active system capture apparatus. Specifically, in this case, the capture apparatus 2 changes a storage device to store the mirror packet from the storage device 2b from which mirror packets are deleted, to the storage device 1b from which mirror packets are not deleted.

Thus, the capture apparatus 2 may reduce amount of mirror packets accumulated in the storage device 2b and avoid occurrence of mirror packets not accumulated by any of the capture apparatus 1 and capture apparatus 2. Consequently, the capture apparatus 2 may accumulate mirror packets efficiently.

Details of First Embodiment

Next, details of a first embodiment are described. FIGS. 11 to 21 are flowcharts illustrating details of the packet capture processing in the first embodiment. FIGS. 22 to 28 illustrate details of the packet capture processing in the first embodiment. Details of the packet capture processing of FIGS. 11 to 21 are described with reference to FIGS. 22 to 28.

[Packet Accumulation Processing]

First, among packet capture processing, a processing (hereinafter also referred to as a packet accumulation processing) of accumulating mirror packets is described.

Figure 11:
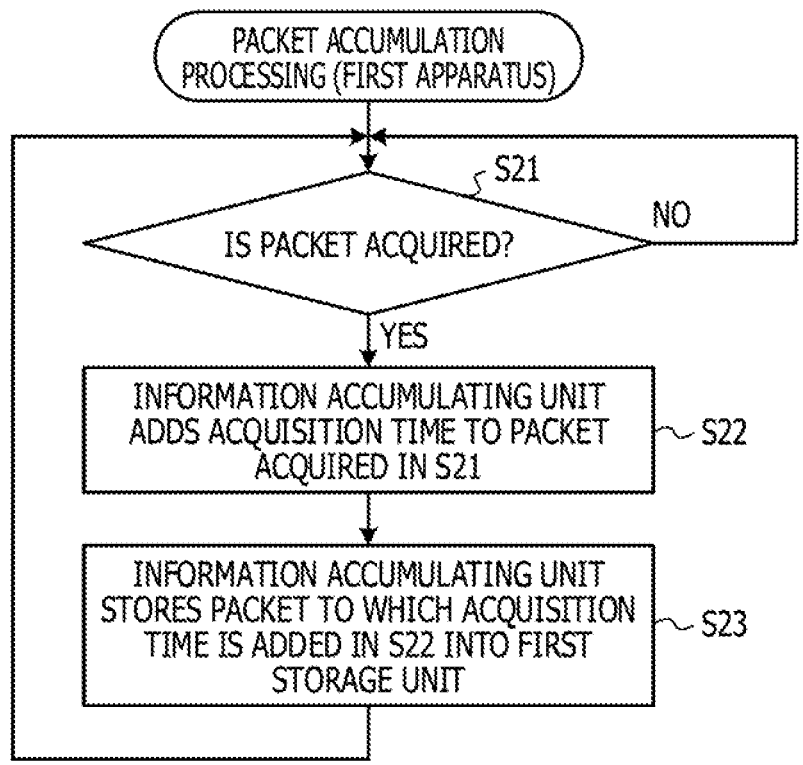
FIG. 11 is a flowchart illustrating details of the packet capture processing in the first embodiment.

As illustrated in FIG. 11, the information receiving unit 211 of the capture apparatus 2 standbys until acquiring a mirror packet transmitted by the network distribution device 2a (S21: NO). Then, upon receiving the mirror packet (S21: YES), the information accumulating unit 212 of the capture apparatus 2 adds the acquisition time to the mirror packet acquired in the processing of the step S21 (S22). Specifically, the information accumulating unit 212 adds the present time to the mirror packet as the acquisition time of the mirror packet.

Thereafter, the information accumulating unit 212 stores the mirror packet to which the acquisition time is added in the processing of the step S22 into the storage device 2b (S23).

Figure 12:
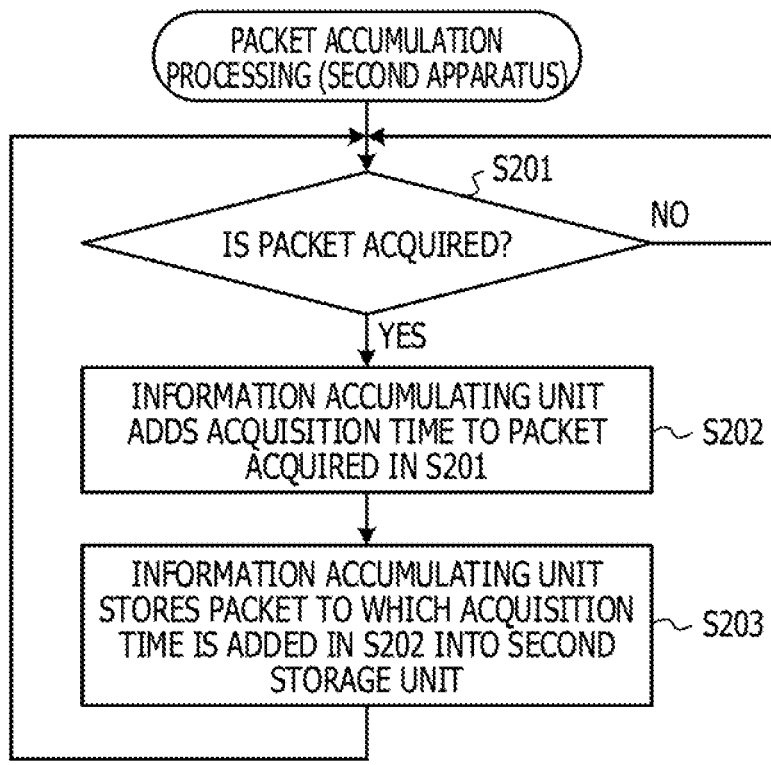
FIG. 12 is a flowchart illustrating details of the packet capture processing in the first embodiment.

As illustrated in FIG. 12, the information receiving unit 111 of the capture apparatus 1 standbys until acquiring the mirror packet transmitted by the network distribution device 1a (S201: NO). Then, upon receiving the mirror packet (S201: YES), the information accumulating unit 112 of the capture apparatus 1 adds the acquisition time to the mirror packet acquired in the processing of the step S201 (S202). Specifically, the information accumulating unit 112 adds the present time to the mirror packet as the acquisition time of the mirror packet.

Thereafter, the information accumulating unit 112 stores the mirror packet to which the acquisition time is added in the processing of the step S202 into the storage device 1b (S203).

[State Determination Processing]

Next, among packet capture processing in the capture apparatus 2, a processing of determining operation state of the capture apparatus 1 (hereinafter also referred to as a state determination processing) is described.

Figure 13:
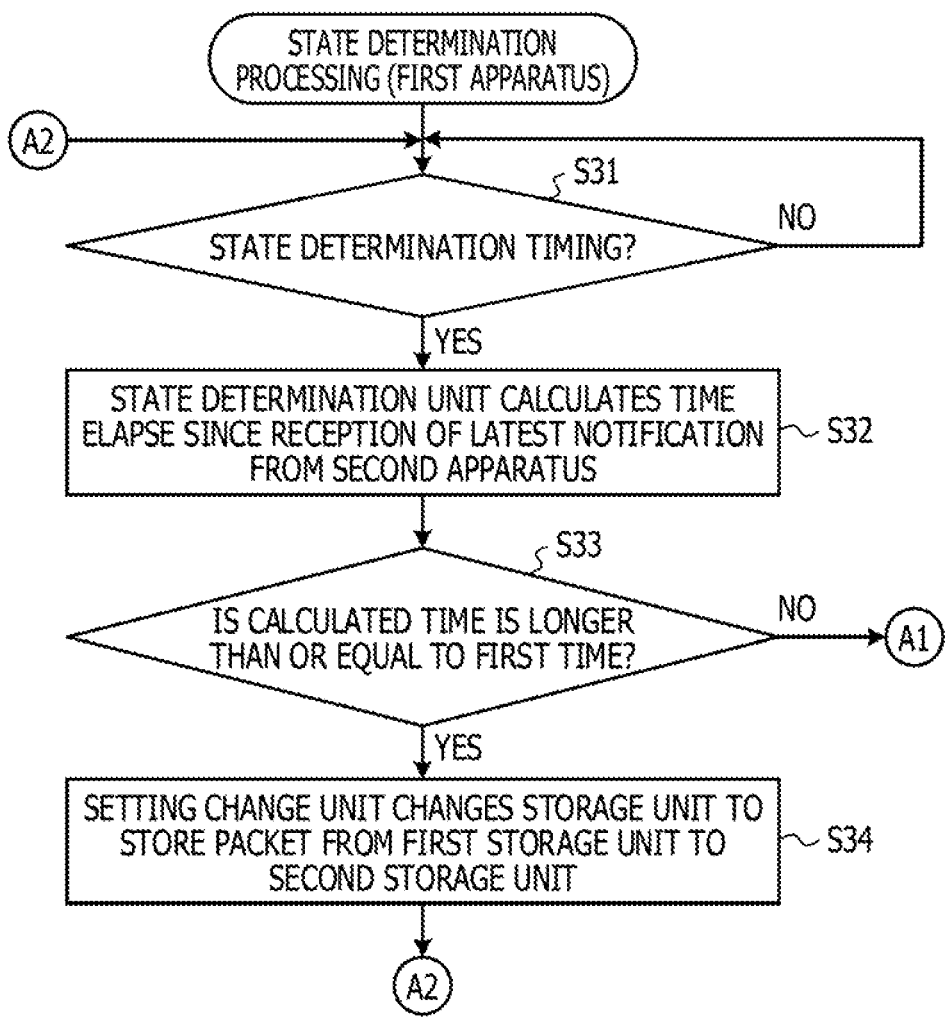
FIG. 13 is a flowchart illustrating details of the packet capture processing in the first embodiment.

As illustrated in FIG. 13, the state determination unit 213 of the capture apparatus 2 standbys until a state determination timing comes (S31: NO). Then, when the state determination timing comes (S31: YES), the state determination unit 213 calculates a time elapsed since reception of a latest alive notification received from the capture apparatus 1 (S32).

Further, the state determination unit 213 determines whether the time calculated in the processing of the step S32 is longer than or equal to the first time (S33). Specifically, the state determination unit 213 may calculate the first time, for example, by referring to the notification time information 231 and the standby time information 232 stored in the information storage area 230 and then perform the processing of the step S33.

Then, in a case where the time calculated in the processing of the step S32 is longer than or equal to the first time (S33: YES), the setting change unit 214 of the capture apparatus 2 changes a storage device to store the mirror packet from the storage device 2b to the storage device 1b (S34). Thereafter, the information receiving unit 211 performs processing of the step S31 and subsequent steps again.

More specifically, in a case where the time calculated in the processing of the step S32 is longer than or equal to the first time, the state determination unit 213 determines that the capture apparatus 1 does not transmit the alive notification to the capture apparatus 2. Thus, in this case, the state determination unit 213 determines that a failure or the like might have occurred in the capture apparatus 1 and thereby mirror packets are not accumulated in the capture apparatus 1. Therefore, in this case, the setting change unit 214 changes a storage device to store mirror packets transmitted from the network distribution device 2a from the storage device 2b from which accumulated mirror packets are deleted, to the storage device 1b from which accumulated mirror packets are not deleted.

Thus, the capture apparatus 2 may avoid deletion of mirror packets not accumulated by the capture apparatus 1.

Figure 14:
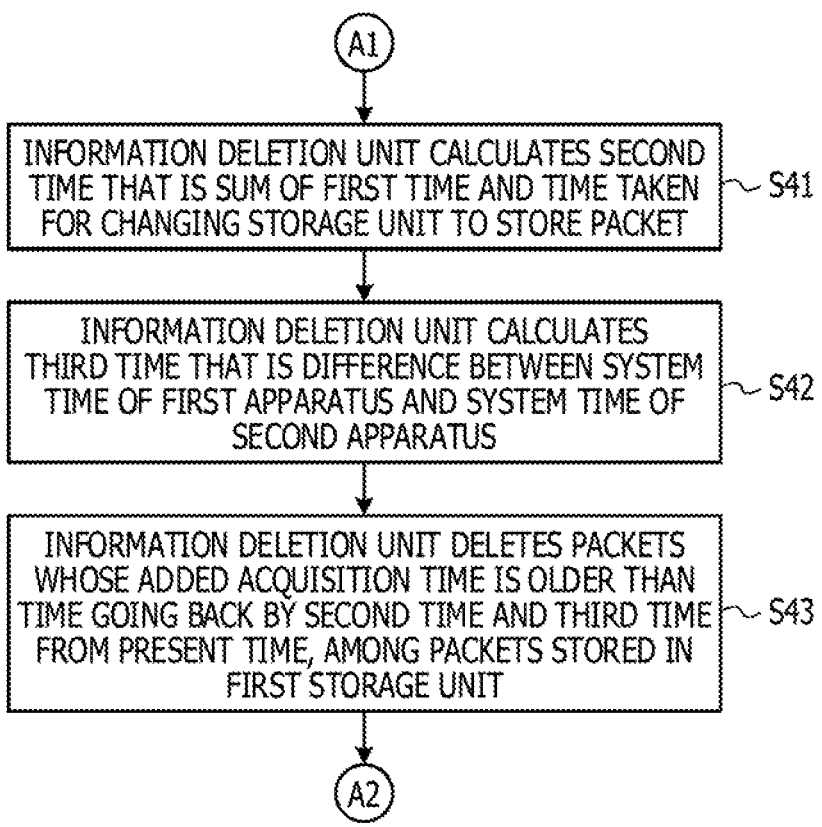
FIG. 14 is a flowchart illustrating details of the packet capture processing in the first embodiment.

On the other hand, in a case where the time calculated in the processing of the step S32 is shorter than the first time (S33: NO), the information deletion unit 215 of the capture apparatus 2 calculates a second time as illustrated in FIG. 14 (S41). Specifically, the information deletion unit 215 may calculate the second time by referring to the notification time information 231, the standby time information 232, and the switching time information 233 stored in the information storage area 230.

Also, in this case, the information deletion unit 215 calculates a third time (S42). The information deletion unit 215 may store the calculated third time into the information storage area 230 as the time difference information 234.

Thereafter, the information deletion unit 215 deletes mirror packets whose added acquisition time is older than a time going back by the second time and third time from the present time, among mirror packets (mirror packet PT2) stored in the storage device 2b (S43). Thereafter, the information receiving unit 211 performs processing of the step S31 and subsequent steps again.

More specifically, in a case where the time calculated in the processing of the step S32 is shorter than the first time, the state determination unit 213 determines that the capture apparatus 1 transmits the alive notification to the capture apparatus 2. Thus, in this case, the state determination unit 213 determines that operation state of the capture apparatus 1 is normal and mirror packets are continuously accumulated in the capture apparatus 1. Consequently, the information deletion unit 215 deletes a part of mirror packets stored in the storage device 2b in order to accumulate mirror packets efficiently.

In this operation, the capture apparatus 2 may take a time before determining that a failure or the like has occurred in the capture apparatus 1. Specifically, the capture apparatus 2 may take a time corresponding to the sum of a time indicated by the notification time information 231 and a time indicated by the standby time information 232 before determining that a failure or the like has occurred in the capture apparatus 1. Further, the capture apparatus 2 takes a time indicated by the switching time information 233 to change a storage device to store mirror packets transmitted from the network distribution device 2a from the storage device 2b to the storage device 1b. In other words, when a failure or the like occurs in the capture apparatus 1, the capture apparatus 2 may take a second time that is the sum of the time indicated by the notification time information 231, being the time indicated by the standby time information 232, and the time indicated by the switching time information 233, before completing change of the storage device to store mirror packets.

The system time referred to for adding the acquisition time to the mirror packet may be different between the capture apparatus 1 and capture apparatus 2. Thus, when determining the range of mirror packets to be deleted, the information deletion unit 215 requests to consider a difference (third time) between a system time of the capture apparatus 1 and a system time of the capture apparatus 2.

Thus, the capture apparatus 2 deletes, for example, only mirror packets whose added acquisition time is older than a time going back by the second time and third time from the present time, among mirror packets stored in the storage device 2b, in the processing of the step S43.

Thus, the capture apparatus 2 may avoid occurrence of mirror packets not accumulated by any of the storage device 1b and storage device 2b.

In a case where the capture apparatus 2 changes the storage device to store mirror packets due to occurrence of a failure or the like in the capture apparatus 1, the capture apparatus 1 (storage device 1b) may suspend accumulation of mirror packets by the capture apparatus 1. Thus, the storage device 1b may avoid storing packets of the same contents two times or more.

[Duplication Determination Processing]

Next, among packet capture processing in the capture apparatus 2, a processing (hereinafter also referred to as a duplication determination processing) of determining whether the same packet (hereinafter also referred to as a duplication packet) exists in mirror packets accumulated in the storage device 1b and mirror packets accumulated in the storage device 2b is described.

Figure 15:
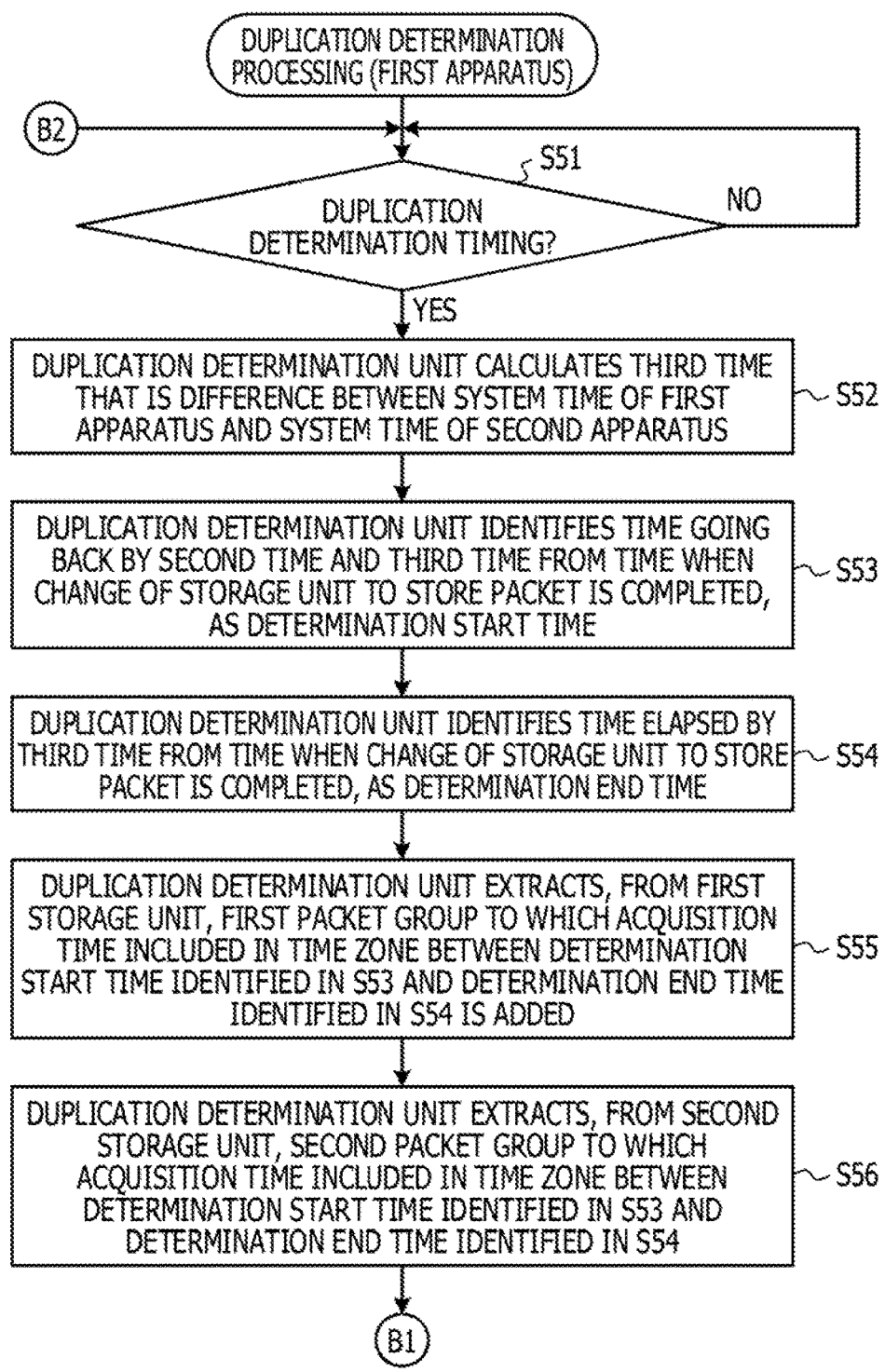
FIG. 15 is a flowchart illustrating details of the packet capture processing in the first embodiment.

As illustrated in FIG. 15, the duplication determination unit 216 of the capture apparatus 2 standbys until a duplication determination timing comes (S51: NO). The duplication determination timing may be, for example, a predetermined timing after completion of the processing of the step S34. More specifically, when occurrence of a failure or the like is detected in the capture apparatus 1, the duplication determination timing may be a timing after the storage device to store mirror packets is changed.

Thereafter, when the duplication determination timing comes (S51: YES), the duplication determination unit 216 calculates a third time (S52). More specifically, the system time referred to for adding the acquisition time to the mirror packet may be different between the capture apparatus 1 and capture apparatus 2. Thus, the duplication determination unit 216 calculates the third time before determining whether a duplication packet exists in mirror packets accumulated in the storage device 1b and mirror packets accumulated in the storage device 2b.

In the processing of the step S52, the duplication determination unit 216 may acquire a time indicated by the time difference information 234 if the time difference information 234 is stored in the information storage area 230.

Then, the duplication determination unit 216 identifies, for example, a time going back by the second time and third time from a time when change of the storage device to store mirror packets is completed, as a start time (hereinafter also referred to as a determination start time) of a range where existence of the duplication packet is determined (S53).

More specifically, among acquisition times added to mirror packets to be determined as to whether it is the duplication packet, an earliest time is an earliest time when a failure or the like might occur in the capture apparatus 1. Then, the earliest time when a failure or the like might occur in the capture apparatus 1 is a time later than a time going back by the second time and third time from a time when change of the storage device to store mirror packets is completed. Thus, the duplication determination unit 216 identifies, for example, a time going back by the second time and third time from a time when change of the storage device to store mirror packets is completed, as a determination start time.

Then, the duplication determination unit 216 identifies, for example, a time elapsed by the third time from a time when change of the storage device to store mirror packets is completed, as an end time (hereinafter also referred to as a determination end time) of a range of determining whether the duplication packet exists (S54).

More specifically, among acquisition times added to mirror packets to be determined as to whether it is the duplication packet, an earliest time is a time elapsed by the third time from a time when change of the storage device accumulating mirror packets is completed. Thus, the duplication determination unit 216 identifies, for example, a time elapsed by the third time from a time when change of the storage device to store mirror packets is completed, as a determination end time.

Next, the duplication determination unit 216 extracts, among mirror packets (mirror packet PT1) stored in the storage device 1b, a packet group (hereinafter also referred to as a first packet group) to which acquisition time included in a time zone between the determination start time identified in the processing of the step S53 and the determination end time identified in the processing of the step S54 is added (S55). Also, the duplication determination unit 216 extracts, among mirror packets (mirror packet PT2) stored in the storage device 2b, a packet group (hereinafter also referred to as a second packet group) to which acquisition time included in a time zone between the determination start time identified in the processing of the step S53 and the determination end time identified in the processing of the step S54 is added (S56). More specifically, the duplication determination unit 216 extracts mirror packets which may include the duplication packet, from the storage device 1b and storage device 2b.

Figure 16:
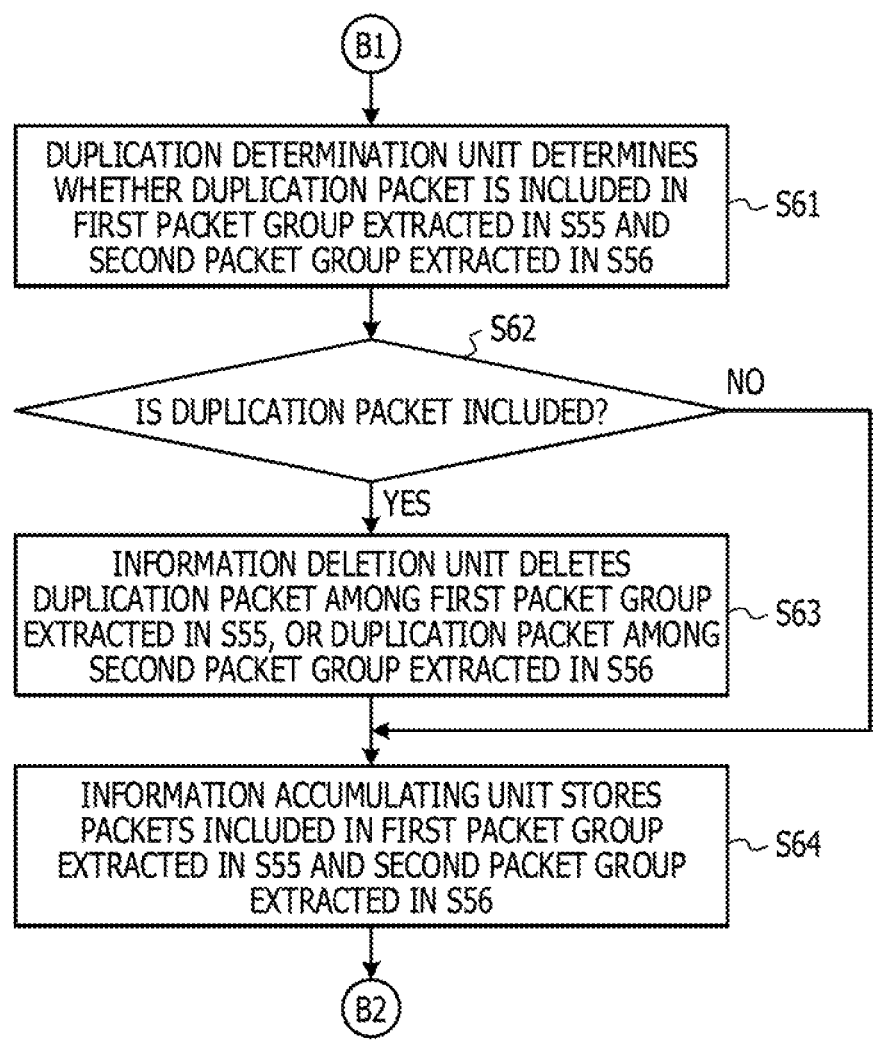
FIG. 16 is a flowchart illustrating details of the packet capture processing in the first embodiment.

Thereafter, as illustrated in FIG. 16, the duplication determination unit 216 determines whether a duplication packet is included in the first packet group extracted in the processing of the step S55 and the second packet group extracted in the processing of the step S56 (S61). Then, when it is determined that the duplication packet is included (S61: YES), the information deletion unit 215 deletes a duplication packet included in the first packet group extracted in the processing of the step S55 or a duplication packet included in the second packet group extracted in the processing of the step S56 (S62).

Then, the information accumulating unit 212 accumulates mirror packets included in the first packet group extracted in the processing of the step S55 and the second packet group extracted in the processing of the step S56 into the storage device 1b (S64). Thereafter, the duplication determination unit 216 performs processing of the step S51 and subsequent steps.

Thus, the information accumulating unit 212 may avoid the duplication packet from being stored into the storage device 1b. After the processing of the step S64, the information deletion unit 215 may delete mirror packets accumulated in the storage device 2b.

[Details of Processing of Steps S61 to S64]

Next, details of processing of steps S61 to S64 are described.

Figure 17:
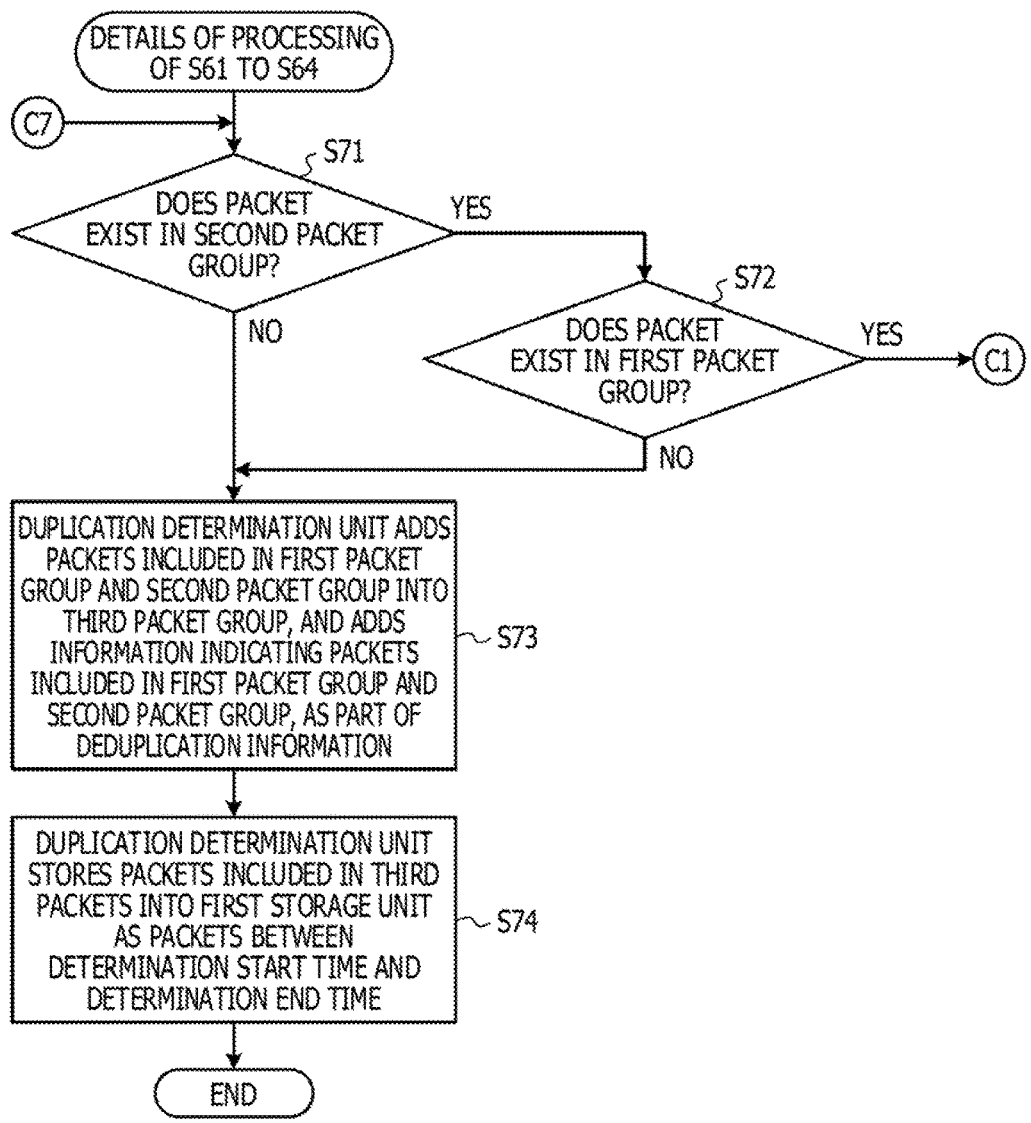
FIG. 17 is a flowchart illustrating details of the packet capture processing in the first embodiment.

As illustrated in FIG. 17, the duplication determination unit 216 determines whether a mirror packet exists in the second packet group extracted in the processing of the step S56 (S71). Then, when it is determined that the mirror packet exists in the second packet group (S71: YES), the duplication determination unit 216 determines whether a mirror packet exists in the first packet group extracted in the processing of the step S55 (S72).

Figure 18:
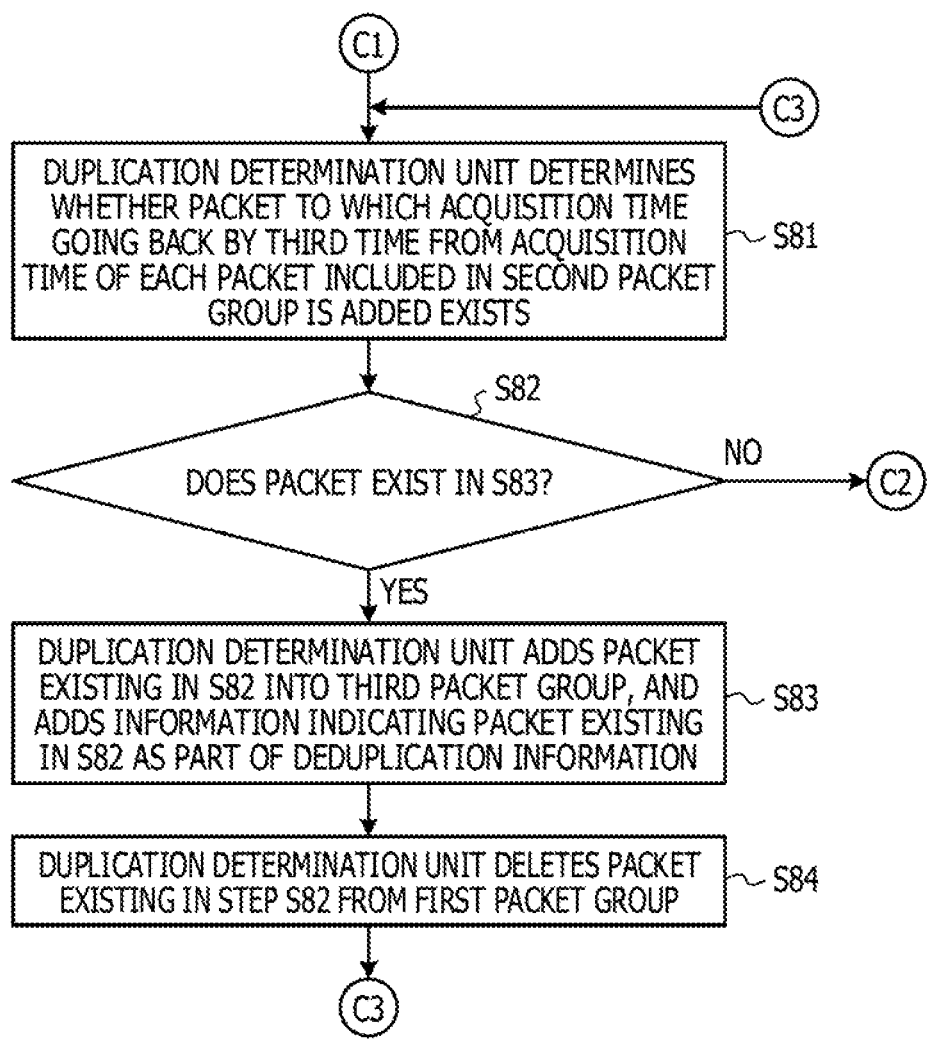
FIG. 18 is a flowchart illustrating details of the packet capture processing in the first embodiment.

Then, in a case where the mirror packet exists in the first packet group (S72: YES), the duplication determination unit 216 determines whether a mirror packet to which an acquisition time going back by more than the third time from acquisition times of mirror packets included in the second packet is added exists in mirror packets included in the first packet group as illustrated in FIG. 18 (S81).

Then, in a case where the mirror packet exists in the processing of the step S81 (S82: YES), the duplication determination unit 216 adds the mirror packet existing in the processing of the step S82 to a packet group (hereinafter also referred to as a third packet group) that is different from the first packet group and second packet group. In this case, the duplication determination unit 216 stores information indicating the mirror packet existing in the processing in the step S82 into the information storage area 230 as a part of the deduplication information 235 (S83). The deduplication information 235 is information including only information indicating mirror packets from which the duplication packet is excluded among mirror packets included in the first packet group extracted in the processing of the step S55 and mirror packets included in the second packet group extracted in the processing of the step S56.

More specifically, in a case where a duplication packet of the mirror packet included in the second packet group exists in the first packet group, the acquisition time of the duplication packet is included in a time between a time going back by the third time from the acquisition time of the mirror packet included in the second packet and a time elapsed by the third time from the acquisition time of the mirror packet included in the second packet. Thus, in a case where a mirror packet to which the acquisition time going back by the third time from acquisition times of mirror packets included in the second packet exists in the first packet group, the duplication determination unit 216 determines that the existing mirror packet is not a duplication packet of the mirror packet included in the second packet group. Therefore, the duplication determination unit 216 stores information indicating the mirror packet existing in the processing in the step S82 into the information storage area 230 as a part of the deduplication information 235. Hereinafter, a specific example of the deduplication information 235 is described.

[Specific Example of Deduplication Information]

FIG. 22 illustrates a specific example of the deduplication information 235. The deduplication information 235 illustrated in FIG. 22 includes "item" identifying information included in the deduplication information 235 and "packet identifier" identifying each of mirror packets after the duplication packet is excluded, as items. Also, the deduplication information 235 illustrated in FIG. 22 includes "acquisition time" to which the acquisition time of each of mirror packets in the capture apparatus 2 is set, as an item. Hereinafter, information including "PT1" is set to the "packet identifier" corresponding to a mirror packet included in the first packet group, and information including "PT2" is set to the "packet identifier" corresponding to a mirror packet included in the second packet group.

Specifically, in the deduplication information 235 illustrated in FIG. 22, information with "item number" of "1" includes "PT2-001" set as "packet identifier", and "Aug. 24, 2016, 11:54:05) set as "acquisition time". Also, in the deduplication information 235 illustrated in FIG. 22, information with "item number" of "3" includes "PT1-003" set as "packet identifier", and "Aug. 24, 2016, 12:00:15) set as "acquisition time". Description of other information included in FIG. 22 is omitted.

Referring back to FIG. 18, the duplication determination unit 216 deletes mirror packets existing in the processing of the step S82 from the first packet group (S84). Thereafter, the duplication determination unit 216 performs processing of the step S81 and subsequent steps.

Figure 19:
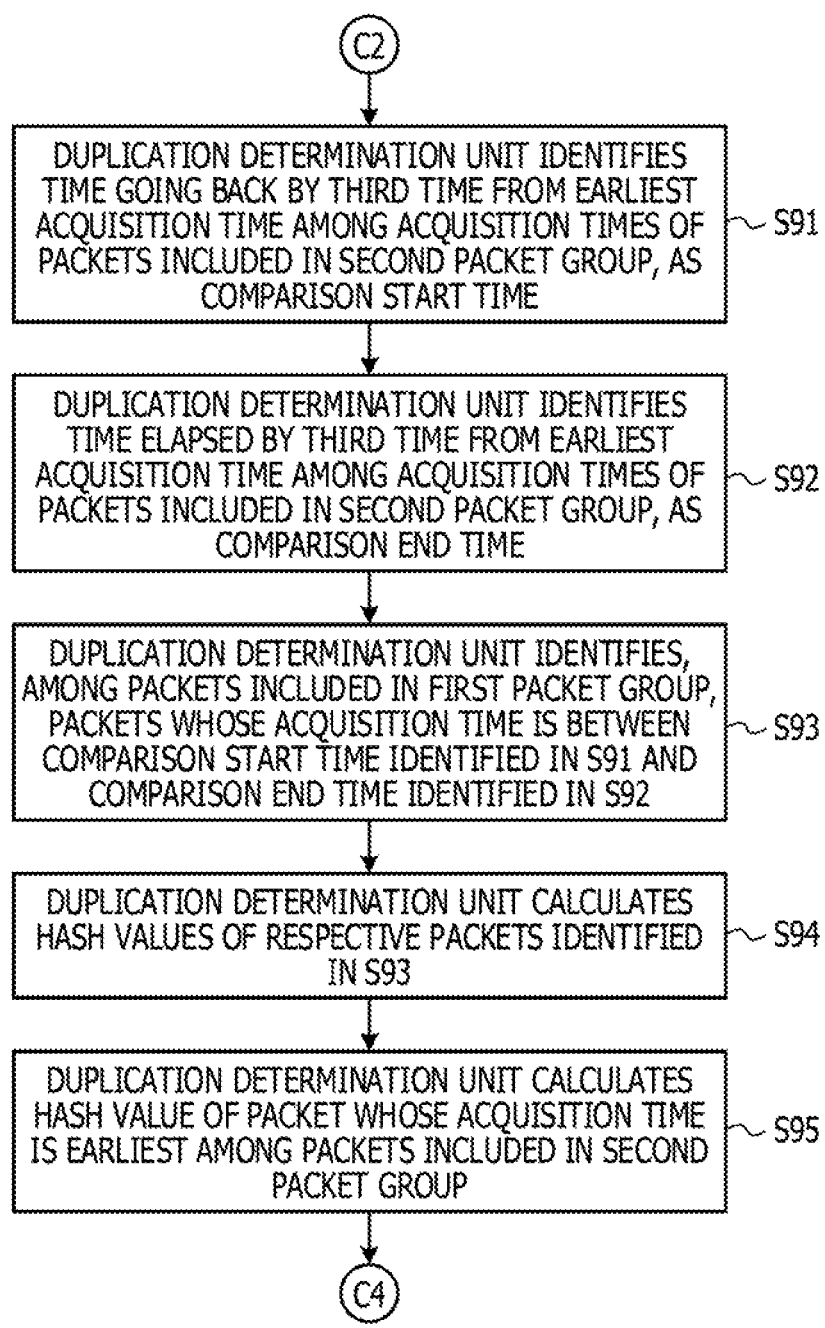
FIG. 19 is a flowchart illustrating details of the packet capture processing in the first embodiment.

On the other hand, in a case where a packet exists in the processing of the step S81 (S82: NO), the duplication determination unit 216 identifies a time going back by the third time from an earliest acquisition time among acquisition times of mirror packets included in the second packet group as a comparison start time, as illustrated in FIG. 19 (S91). Also, in this case, the duplication determination unit 216 identifies a time elapsed by the third time from an earliest acquisition time as a comparison end time, among acquisition times of mirror packets included in the second packet group (S92).

More specifically, in a case where a duplication packet of a mirror packet included in the second packet group exists in the first packet group, the acquisition time of the duplication packet is included in a time between a time going back by the third time from the acquisition time of the mirror packet included in the second packet and a time elapsed by the third time from the acquisition time of the mirror packet included in the second packet. Thus, the duplication determination unit 216 identifies a time going back by the third time from the acquisition time of mirror packets included in the second packet group as a comparison start time, and identifies a time elapsed by the third time from the acquisition time of mirror packets included in the second packet group as a comparison end time.

Then, the duplication determination unit 216 identifies mirror packets (hereinafter referred to as a deletion candidate packet) between the comparison start time identified in the processing of the step S91 and the comparison end time identified in the processing of the step S92, among mirror packets included in the first packet group (S93). More specifically, the duplication determination unit 216 identifies, from mirror packets included in the first packet group, a mirror packet that may be a duplication packet of a mirror packet included in the second packet group.

Next, the duplication determination unit 216, for example, calculates hash values of respective mirror packets identified in the processing of the step S93 (S94). The duplication determination unit 216 calculates, for example, the hash value of a mirror packet of the earliest acquisition time among mirror packets included in the second packet group (S95).

Figure 20:
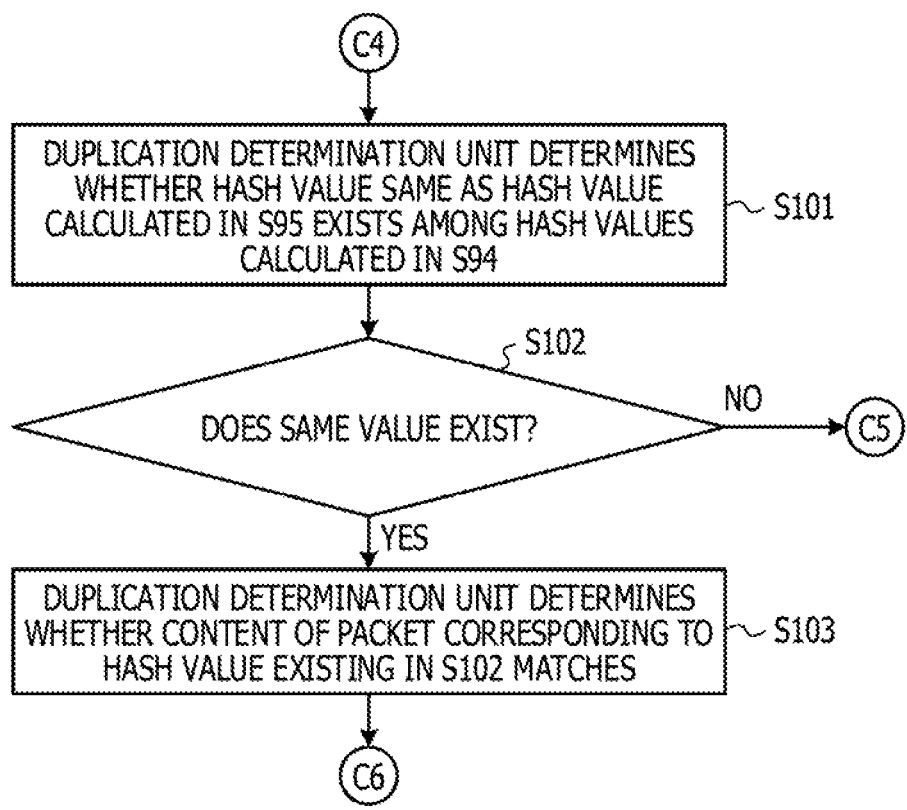
FIG. 20 is a flowchart illustrating details of the packet capture processing in the first embodiment.

Thereafter, as illustrated in FIG. 20, the duplication determination unit 216 determines, for example, whether a hash value same as the hash value calculated in the processing of the step S95 exists in hash values calculated in the processing of the step S94 (S101). Then, in a case where a hash value same as the hash value calculated in the processing of the step S95 exists in hash values calculated in the processing of the step S94 (S102: YES), the duplication determination unit 216 determines whether the content of the mirror packet of the earliest acquisition time among mirror packets included in the second packet group and the content of the mirror packet corresponding to the hash value existing in the processing of the step S102 match each other (S103).

That is, the duplication determination unit 216 may determine that a plurality of mirror packets with different hash values are different mirror packets. The duplication determination unit 216 may determine that a mirror packet having the same hash value may be a mirror packet of the same content. Thus, the duplication determination unit 216 determines whether contents of mirror packets identified as having the same hash value in the processing of the step S102 match each other.

Thus, the duplication determination unit 216 may reduce the processing load involved in determining whether contents of mirror packets match each other.

Figure 21:
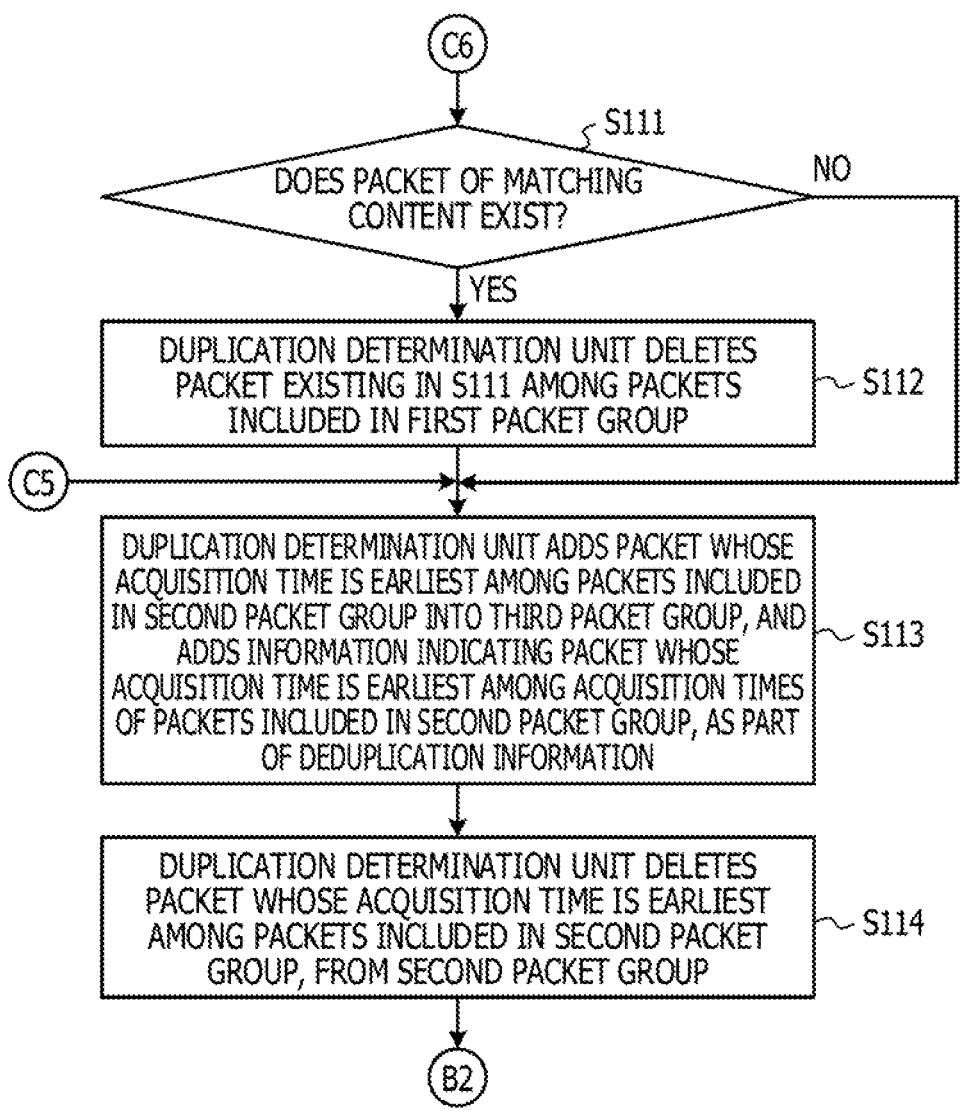
FIG. 21 is a flowchart illustrating details of the packet capture processing in the first embodiment.

Then, when it is determined that a mirror packet having the matching content exists (S111: YES), the duplication determination unit 216 deletes, from the first packet group, the mirror packet determined to exist in the processing of the step S111 among mirror packets included in the first packet group, as illustrated in FIG. 21 (S112).

More specifically, in this case, the duplication determination unit 216 deletes the mirror packet without storing information indicating the duplication packet determined to exist, as a part of the deduplication information 235. Thus, the duplication determination unit 216 may keep the information indicating the duplication packet from being included in the deduplication information 235.

On the other hand, when it is determined that the mirror packet having the matching content does not exist (S111: NO), the duplication determination unit 216 does not perform the processing of the step S112.

Thereafter, the duplication determination unit 216 adds a mirror packet of the earliest acquisition time among mirror packets included in the second packet group into the third packet group. Then, the duplication determination unit 216 stores information indicating the mirror packet of the earliest acquisition time among mirror packets included in the second packet group into the information storage area 230 as a part of the deduplication information 235 (S113). In the processing of the step S102, even when a hash value same as the hash value calculated in the step S95 does not exist (S102: NO), the duplication determination unit 216 performs the processing of the step S113. Then, after the processing of the step S113, the duplication determination unit 216 deletes the mirror packet of the earliest acquisition time among mirror packets included in the second packet group from the second packet group (S114). Thereafter, the duplication determination unit 216 performs processing of the step S71 and subsequent steps again.

On the other hand, in the processing of the step S71 illustrated in FIG. 17, when it is determined that a mirror packet does not exist in the second packet group extracted in the processing of the step S56 described with reference to FIG. 15 (S71: NO), the duplication determination unit 216 adds a mirror packet included in the first packet group into the third packet group. Then, in this case, the duplication determination unit 216 stores information indicated by the mirror packet included in the first packet group into the information storage area 230 as a part of the deduplication information 235 (S73).

When determined that a mirror packet does not exist in the first packet group extracted in the processing of the step S55 (S72: NO), the duplication determination unit 216 adds a mirror packet included in the second packet group into the third packet group. Then, in this case, the duplication determination unit 216 stores information indicated by the mirror packet included in the second packet group into the information storage area 230 as a part of the deduplication information 235 (S73).

Thereafter, the duplication determination unit 216 stores the mirror packet included in the third packet group (mirror packet whose information is included in the deduplication information 235) into the storage device 1b as a mirror packet between the determination start time and determination end time (S74).

In the processing of the step S73, the duplication determination unit 216 may change the acquisition time added to the mirror packet included in the second packet group among mirror packets included in the third packet group to a system time of the capture apparatus 1. Specifically, in this case, the duplication determination unit 216 identifies, from information included in the deduplication information 235, information in which information including "PT2" in "packet identifier" is included. Then, in a case where the system time of the capture apparatus 1 is ahead the system time of the capture apparatus 2, the duplication determination unit 216 may add a time obtained by adding a time set to "acquisition time" of identified information to the mirror packet corresponding to the identified information. In a case where the system time of the capture apparatus 1 is behind the system time of the capture apparatus 2, the duplication determination unit 216 may add a time obtained by subtracting the third time set to "acquisition time" of identified information to the mirror packet corresponding to the identified information.

Thus, the duplication determination unit 216 may add the acquisition time of the system time of the capture apparatus 1 to all mirror packets accumulated in the storage device 1b. Consequently, the duplication determination unit 216 may make matching between the generation order of mirror packets accumulated in the storage device 1b and the sequence of acquisition times added to mirror packets accumulated in the storage device 1b.

[Specific Example of Processing of Steps S61 to S64]

Next, a specific example of processing of steps S61 to S64 is described.

As illustrated in FIG. 23A, the duplication determination unit 216 extracts mirror packets represented by "1", "2", "3" "4", "5", and "6" in the descending order of acquisition time as the first packet group (S55). Hereinafter, mirror packets represented by "1", "2", "3", "4", "5", and "6" are also referred to as "packet 1", "packet 2", "packet 3", "packet 4", "packet 5", and "packet 6" respectively. As illustrated in FIG. 23A, the duplication determination unit 216 extracts mirror packets represented by "a", "b", and "c" in the descending order of acquisition time as the second packet group (S56). Hereinafter, mirror packets represented by "a", "b", and "c" are also referred to as "packet a", "packet b", and "packet c" respectively.

Then, the duplication determination unit 216 determines whether a mirror packet to which an acquisition time going back by more than the third time from acquisition times of mirror packets included in the second packet is added exists in mirror packets included in the first packet group (S81). As a result, for example, when it is determined that the acquisition time of "packet 1" is a time going back by more than the third time from each of acquisition times of "packet a", "packet b", and "packet c", the duplication determination unit 216 adds "packet 1" into the third packet group as illustrated in FIG. 23B (S82: YES, S83, S84).

Next, the duplication determination unit 216 determines whether the duplication packet of "packet a" exists in the first packet group. Specifically, the duplication determination unit 216 identifies the time going back by the third time from the acquisition time of "packet a" as the comparison start time of "packet a" (S91). Also, the duplication determination unit 216 identifies the time elapsed by the third time from the acquisition time of "packet a" as the comparison end time of "packet a" (S92). Then, the duplication determination unit 216 identifies, for example, "packet 2", "packet 3", and "packet 4" as mirror packets whose acquisition time is between the comparison start time of "packet a" and the comparison end time of "packet a" among mirror packets included in the first packet group, as illustrated by shaded portion of FIG. 24A (S93).

Thereafter, for example, when it is determined that "packet a" and "packet 2" are duplication packets, the duplication determination unit 216 deletes "packet 2" and moves "packet a" from the second packet group to the third packet group as illustrated in FIG. 24B (S103, S111: YES, S112, S113, S114).

Next, the duplication determination unit 216 determines whether the duplication packet of "packet b" exists in the first packet group. Specifically, the duplication determination unit 216 identifies the time going back by the third time from the acquisition time of "packet b" as the comparison start time of "packet b" (S91). Also, the duplication determination unit 216 identifies the time elapsed by the third time from the acquisition time of "packet b" as the comparison end time of "packet b" (S92). Then, the duplication determination unit 216 identifies "packet 3", "packet 4", "packet 5", and "packet 6" as mirror packets whose acquisition time is between the comparison start time of "packet b" and the comparison end time of "packet a" among mirror packets included in the first packet group, as illustrated by shaded portion of FIG. 25A (S93).

Thereafter, for example, when it is determined that duplication packets of "packet 3", "packet 4", "packet 5", and "packet 6" do not exist, the duplication determination unit

216 moves "packet b" from the second packet group to the third packet group as illustrated in FIG. 25B (S103, S111: NO, S113, S114).

Then, for example, when it is determined that the acquisition time of "packet 3" is a time going back by more than the third time from the acquisition time of "packet c", the duplication determination unit 216 includes "packet 3" into the third packet group as illustrated in FIG. 26A (S81, S82: YES, S83, S84).

Next, the duplication determination unit 216 determines whether the duplication packet of "packet c" exists in the first packet group. Specifically, the duplication determination unit 216 identifies the time going back by the third time from the acquisition time of "packet c" as the comparison start time of "packet c" (S91). Also, the duplication determination unit 216 identifies the time elapsed by the third time from the acquisition time of "packet c" as the comparison end time of "packet c" (S92). Then, the duplication determination unit 216 identifies, for example, "packet 4", "packet 5", and "packet 6" as mirror packets whose acquisition time is between the comparison start time of "packet c" and the comparison end time of "packet c" among mirror packets included in the first packet group, as illustrated by shaded portion of FIG. 26B (S93).

Thereafter, for example, when it is determined that "packet c" and "packet 4" are duplication packets, the duplication determination unit 216 deletes "packet 4" and moves "packet c" from the second packet group to the third packet group as illustrated in FIG. 27A (S103, S111: YES, S112, S113, S114).

Then, since no mirror packets exist in the second packet group, the duplication determination unit 216 moves all mirror packets included in the first packet group from the first packet group to the third packet group as illustrated in FIG. 27B (S73).

In the processing of the step S113, when it is determined that a duplication packet of the mirror packet included in the second packet group exists in the first packet group, the duplication determination unit 216 may include mirror packets included in the first packet group but not mirror packets included in the second packet group, into the third packet group.

Figure 28:
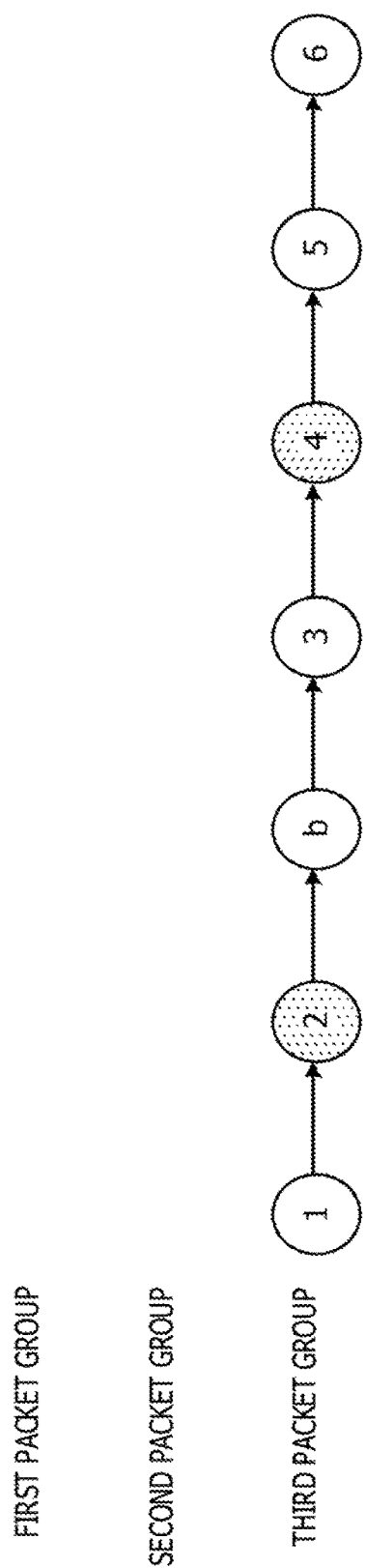
FIG. 28 illustrates specific examples of processing of S61 to S64.

FIG. 28 illustrates a specific example of the case where a mirror packet included in the first packet group is included into the third packet group when a duplication packet exists. In this case, as illustrated by a shaded portion of FIG. 28, the duplication determination unit 216 adds "packet 2" and "packet 4" to the third packet in place of "packet a" and "packet c"

Thus, the capture apparatus 2 acquires mirror packets flowing in the network and stores into the storage device 2b. Then, the capture apparatus 2 determines operation state of the active system capture apparatus 1, and when it is determined that operation state of the capture apparatus 1 is in the first state, the capture apparatus 2 deletes mirror packets stored in the storage device 2b. On the other hand, when it is determined that operation state of the capture apparatus 1 is in the first state, the capture apparatus 2 changes the storage device to store the mirror packet from the storage device 2b to the storage device 1b.

Thus, the capture apparatus 2 may avoid occurrence of a mirror packet which is not accumulated in both the capture apparatus 1 and capture apparatus 2 without storing all mirror packets acquired from the network distribution device 2a into the storage device 2b. Consequently, the capture apparatus 2 may accumulate mirror packets efficiently.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A packet capturing system comprising:
    a first apparatus configured to be coupled to a network, the first apparatus including a first memory and a first processor coupled to the first memory, the first processor being configured to store, into a first storage device, a first mirror packet which is generated by mirroring a first packet transmitted in the network; and
    a second apparatus configured to be coupled to the network, the second apparatus including a second memory and a second processor coupled to the second memory, the second processor being configured to store the first mirror packet into a second storage device,
    wherein the first processor is configured to:
    determine whether the second apparatus is in an operation state or a non-operation state,
    delete, when the first processor determines the second apparatus is in the operation state, the first mirror packet stored in the first storage device, and
    store into the second storage device, when the first processor determines the second apparatus is in the non-operation state, a second mirror packet generated by mirroring a second packet transmitted in the network, while maintaining the first mirror packet stored in the first storage device.

2. The packet capturing system according to claim 1, wherein
    the first processor is configured to:
    change, when the first processor determines the second apparatus is in the non-operation state, a data transmission destination of the first processor from the first storage device to the second storage device.

3. The packet capturing system according to claim 1, wherein
    the second processor is configured to transmit a plurality of notifications at intervals of a first time when the second apparatus is in the operation state, and
    the first processor is configured to determine that the second apparatus is in the non-operation state when the first processor does not receive the plurality of notifications at the intervals of the first time.

4. The packet capturing system according to claim 1, wherein
    an analysis is executed based on the first mirror packet stored in the first storage device and the second mirror packet stored in the second storage device.

5. The packet capturing system according to claim 1, wherein the first processor is configured to:
    identify a difference between a first system time measured by the first apparatus and a second system time measured by the second apparatus,
    store, into the first storage device, first capture clock time information indicating a first clock time when the first packet is stored into the first storage device, and determine, based on the first clock time indicated by the first capture clock time information and the difference, whether to delete the first mirror packet from the first storage device.

6. The packet capturing system according to claim 2, wherein the first processor is configured to:
    determine whether the first mirror packet is stored in both of the first storage device and the second storage device, and
    delete, when the first processor determines the first mirror packet is stored in both of the first storage device and the second storage device, the first mirror packet from one of the first storage device and the second storage device.

7. A packet capturing apparatus configured to be coupled to a network, the capturing apparatus comprising:
    a memory; and
    a processor coupled to the memory configured to:
    store, into a storage device, a first mirror packet which is generated by mirroring a first packet transmitted in the network, the first mirror packet being stored in another storage device of another capturing apparatus configured to be coupled to the network,
    determine whether the another capturing apparatus is in an operation state or a non-operation state,
    delete, when the another capturing apparatus is determined to be in the operation state, the first mirror packet stored in the storage device, and
    store into the another storage device, when the another capturing apparatus is in the non-operation state, a second mirror packet generated by mirroring a second packet transmitted in the network, while maintaining the first mirror packet stored in the storage device.

8. The packet capturing apparatus according to claim 7, wherein the processor is configured to:
    change, when the another capturing apparatus is in the non-operation state, a data transmission destination of the processor from the storage device to the another storage device.

9. The packet capturing apparatus according to claim 7, wherein
    the another capturing apparatus is configured to transmit a plurality of notifications at intervals of a first time when the another capturing apparatus is in the operation state, and
    the processor is configured to determine the another capturing apparatus is in the non-operation state when the processor does not receive the plurality of notifications at the intervals of the first time.

10. The packet capturing apparatus according to claim 7, wherein
    an analysis is executed based on the first mirror packet stored in the storage apparatus and the second mirror packet stored in the another storage device.

11. The packet capturing apparatus according to claim 7, wherein the processor is configured to:
    identify a difference between a first system time measured by the capturing apparatus and a second system time measured by the another capturing apparatus,
    store, into the storage device, first capture clock time information indicating a first clock time when the first packet is stored into the storage device, and
    determine, based on the first clock time indicated by the first capture clock time information and the difference, whether to delete the first mirror packet from the storage device.

12. The packet capturing apparatus according to claim 8, wherein the processor is configured to:
    determine whether the first mirror packet is stored in both of the storage device and the another storage device, and
    delete, when the first mirror packet is determined to be stored in both of the storage device and the another storage device, the first mirror packet from one of the storage device and the another storage device.

13. A method of capturing a plurality of packets through a network, the method comprising:
    storing, by a capturing apparatus coupled to the network, into a storage device, a first mirror packet which is generated by mirroring a first packet transmitted in the network;
    determining whether another capturing apparatus is in an operation state or a non-operation state, the another capturing apparatus being coupled to the network and storing the first mirror packet into another storage device while the another capturing apparatus is in the operation state;
    deleting by the capturing apparatus, when the capturing apparatus determines the another capturing apparatus is in the operation state, the first mirror packet stored in the storage device; and
    storing into the another storage device, when the capturing apparatus determines the another capturing apparatus is in the non-operation state, a second mirror packet generated by mirroring a second packet transmitted in the network, while maintaining the first mirror packet stored in the storage device.

14. The method according to claim 13 further comprising:
    changing, when the capturing apparatus determines the another capturing apparatus is in the non-operation state, a data transmission destination of the processor from the storage device to the another storage device.

15. The method according to claim 13 further comprising:
    transmitting, from the another capturing apparatus to the capturing apparatus, a plurality of notifications at intervals of a first time when the another capturing apparatus is in the operation state; and
    determining, by the capturing apparatus, that the another capturing apparatus is in the non-operation state when the capturing apparatus does not receive the plurality of notifications at the intervals of the first time.

16. The method according to claim 13 further comprising:
    analyzing a condition of the network based on the first mirror packet stored in the storage device and the second mirror packet stored in the another storage device.

17. The method according to claim 13 further comprising:
    identifying a difference between a first system time measured by the capturing apparatus and a second system time measured by the another capturing apparatus;
    store, into the storage device, first capture clock time information indicating a first clock time when the first mirror packet is stored into the storage device; and
    determining by the capturing apparatus, based on the first clock time indicated by the first capture clock time information and the difference, whether to delete the first mirror packet from the storage device.

18. The method according to claim 14 further comprising:
    determining, by the capturing apparatus, whether the first mirror packet is stored in both of the storage device and the another storage device; and
    deleting, when the capturing apparatus determines the first mirror packet is stored in both of the storage device and the another storage device, the first mirror packet from one of the storage device and the another storage device.

* * * * *